US008737173B2

(12) United States Patent
Olson

(10) Patent No.: US 8,737,173 B2
(45) Date of Patent: May 27, 2014

(54) DATE AND TIME DIMENSIONS FOR CONTACT CENTER REPORTING IN ARBITRARY INTERNATIONAL TIME ZONES

(75) Inventor: Jeffrey James Olson, Boulder, CO (US)

(73) Assignee: Avaya Inc., Basking Ridge, NJ (US)

( * ) Notice: Subject to any disclaimer, the term of this patent is extended or adjusted under 35 U.S.C. 154(b) by 2382 days.

(21) Appl. No.: 11/361,747

(22) Filed: Feb. 24, 2006

(65) Prior Publication Data
US 2007/0201311 A1 Aug. 30, 2007

(51) Int. Cl.
G06F 15/16 (2006.01)
(52) U.S. Cl.
USPC .......................................................... 368/46
(58) Field of Classification Search
USPC ..................................................... 368/21, 46
See application file for complete search history.

(56) References Cited

U.S. PATENT DOCUMENTS

| 4,163,124 | A | 7/1979 | Jolissaint |
| 4,510,351 | A | 4/1985 | Costello et al. |
| 4,567,323 | A | 1/1986 | Lottes et al. |
| 4,737,983 | A | 4/1988 | Frauenthal et al. |
| 4,797,911 | A | 1/1989 | Szlam et al. |
| 4,894,857 | A | 1/1990 | Szlam et al. |
| 5,001,710 | A | 3/1991 | Gawrys et al. |
| 5,097,528 | A | 3/1992 | Gursahaney et al. |
| 5,101,425 | A | 3/1992 | Darland |
| 5,155,761 | A | 10/1992 | Hammond |
| 5,164,983 | A | 11/1992 | Brown et al. |
| 5,167,010 | A | 11/1992 | Elm et al. |
| 5,185,780 | A | 2/1993 | Leggett |
| 5,206,903 | A | 4/1993 | Kohler et al. |
| 5,210,789 | A | 5/1993 | Jeffus et al. |
| 5,274,700 | A | 12/1993 | Gechter et al. |
| 5,278,898 | A | 1/1994 | Cambray et al. |
| 5,289,368 | A | 2/1994 | Jordan et al. |
| 5,291,550 | A | 3/1994 | Levy et al. |
| 5,299,260 | A | 3/1994 | Shaio |
| 5,309,513 | A | 5/1994 | Rose |
| 5,335,268 | A | 8/1994 | Kelly, Jr. et al. |
| 5,335,269 | A | 8/1994 | Steinlicht |
| 5,390,243 | A | 2/1995 | Casselman et al. |

(Continued)

FOREIGN PATENT DOCUMENTS

| CA | 2143198 | 1/1995 |
| CA | 2174762 | 3/1996 |

(Continued)

OTHER PUBLICATIONS

Kimball, et al., "The Complete Guide to Dimensional Modeling." *The Data Warehouse Toolkit.* $2^{nd}$ Edition, 2002. Ch. 11, pp. 240-241.

(Continued)

*Primary Examiner* — Sean Kayes
(74) *Attorney, Agent, or Firm* — Sheridan Ross P.C.

(57) ABSTRACT

In one embodiment, a computer readable medium is provided that includes a date time zone dimension table comprising a date key and a time zone key, the date key identifying a selected point in time relative to a selected temporal origin and the time zone key identifying one of a plurality of possible time zones, and at least one attribute, the at least one attribute describing time information for a selected date and time zone key pair.

15 Claims, 6 Drawing Sheets

(56) References Cited

U.S. PATENT DOCUMENTS

| | | |
|---|---|---|
| 5,436,965 A | 7/1995 | Grossman et al. |
| 5,444,774 A | 8/1995 | Friedes |
| 5,469,503 A | 11/1995 | Butensky et al. |
| 5,469,504 A | 11/1995 | Blaha |
| 5,473,773 A | 12/1995 | Aman et al. |
| 5,479,497 A | 12/1995 | Kovarik |
| 5,500,795 A | 3/1996 | Powers et al. |
| 5,504,894 A | 4/1996 | Ferguson et al. |
| 5,506,898 A | 4/1996 | Costantini et al. |
| 5,530,744 A | 6/1996 | Charalambous et al. |
| 5,537,470 A | 7/1996 | Lee |
| 5,537,542 A | 7/1996 | Eilert et al. |
| 5,544,232 A | 8/1996 | Baker et al. |
| 5,546,452 A | 8/1996 | Andrews et al. |
| 5,555,299 A | 9/1996 | Maloney et al. |
| 5,577,169 A | 11/1996 | Prezioso |
| 5,592,378 A | 1/1997 | Cameron et al. |
| 5,592,542 A | 1/1997 | Honda et al. |
| 5,594,726 A | 1/1997 | Thompson et al. |
| 5,603,029 A | 2/1997 | Aman et al. |
| 5,606,361 A | 2/1997 | Davidsohn et al. |
| 5,611,076 A | 3/1997 | Durflinger et al. |
| 5,627,884 A | 5/1997 | Williams et al. |
| 5,642,515 A | 6/1997 | Jones et al. |
| 5,684,872 A | 11/1997 | Flockhart et al. |
| 5,684,964 A | 11/1997 | Powers et al. |
| 5,689,698 A | 11/1997 | Jones et al. |
| 5,703,943 A | 12/1997 | Otto |
| 5,713,014 A | 1/1998 | Durflinger et al. |
| 5,724,092 A | 3/1998 | Davidsohn et al. |
| 5,740,238 A | 4/1998 | Flockhart et al. |
| 5,742,675 A | 4/1998 | Kilander et al. |
| 5,742,763 A | 4/1998 | Jones |
| 5,748,468 A | 5/1998 | Notenboom et al. |
| 5,749,079 A | 5/1998 | Yong et al. |
| 5,751,707 A | 5/1998 | Voit et al. |
| 5,752,027 A | 5/1998 | Familiar |
| 5,754,639 A | 5/1998 | Flockhart et al. |
| 5,754,776 A | 5/1998 | Hales et al. |
| 5,754,841 A | 5/1998 | Carino, Jr. |
| 5,757,904 A | 5/1998 | Anderson |
| 5,790,677 A | 8/1998 | Fox et al. |
| 5,794,250 A | 8/1998 | Carino, Jr. et al. |
| 5,796,393 A | 8/1998 | MacNaughton et al. |
| 5,802,282 A | 9/1998 | Hales et al. |
| 5,802,510 A | 9/1998 | Jones |
| 5,818,907 A | 10/1998 | Maloney et al. |
| 5,819,084 A | 10/1998 | Shapiro et al. |
| 5,825,869 A | 10/1998 | Brooks et al. |
| 5,826,039 A | 10/1998 | Jones |
| 5,828,747 A | 10/1998 | Fisher et al. |
| 5,838,968 A | 11/1998 | Culbert |
| 5,839,117 A | 11/1998 | Cameron et al. |
| 5,864,874 A | 1/1999 | Shapiro |
| 5,875,437 A | 2/1999 | Atkins |
| 5,880,720 A | 3/1999 | Iwafune et al. |
| 5,881,238 A | 3/1999 | Aman et al. |
| 5,884,032 A | 3/1999 | Bateman et al. |
| 5,889,956 A | 3/1999 | Hauser et al. |
| 5,897,622 A | 4/1999 | Blinn et al. |
| 5,903,641 A | 5/1999 | Tonisson |
| 5,903,877 A | 5/1999 | Berkowitz et al. |
| 5,905,793 A | 5/1999 | Flockhart et al. |
| 5,911,134 A | 6/1999 | Castonguay et al. |
| 5,914,951 A | 6/1999 | Bentley et al. |
| 5,915,012 A | 6/1999 | Miloslavsky |
| 5,923,745 A | 7/1999 | Hurd |
| 5,926,538 A | 7/1999 | Deryugin et al. |
| 5,930,786 A | 7/1999 | Carino, Jr. et al. |
| 5,937,051 A | 8/1999 | Hurd et al. |
| 5,937,402 A | 8/1999 | Pandilt |
| 5,940,496 A | 8/1999 | Gisby et al. |
| 5,943,416 A | 8/1999 | Gisby |
| 5,948,065 A | 9/1999 | Eilert et al. |
| 5,960,073 A | 9/1999 | Kikinis et al. |
| 5,963,635 A | 10/1999 | Szlam et al. |
| 5,963,911 A | 10/1999 | Walker et al. |
| 5,970,132 A | 10/1999 | Brady |
| 5,974,135 A | 10/1999 | Breneman et al. |
| 5,974,462 A | 10/1999 | Aman et al. |
| 5,982,873 A | 11/1999 | Flockhart et al. |
| 5,987,117 A | 11/1999 | McNeil et al. |
| 5,991,392 A | 11/1999 | Miloslavsky |
| 5,996,013 A | 11/1999 | Delp et al. |
| 5,999,963 A | 12/1999 | Bruno et al. |
| 6,000,832 A | 12/1999 | Franklin et al. |
| 6,011,844 A | 1/2000 | Uppaluru et al. |
| 6,014,437 A | 1/2000 | Acker et al. |
| 6,031,896 A | 2/2000 | Gardell et al. |
| 6,038,293 A | 3/2000 | McNerney et al. |
| 6,038,296 A | 3/2000 | Brunson et al. |
| 6,044,144 A | 3/2000 | Becker et al. |
| 6,044,205 A | 3/2000 | Reed et al. |
| 6,044,355 A | 3/2000 | Crockett et al. |
| 6,049,547 A | 4/2000 | Fisher et al. |
| 6,049,779 A | 4/2000 | Berkson |
| 6,052,723 A | 4/2000 | Ginn |
| 6,055,308 A | 4/2000 | Miloslavsky et al. |
| 6,064,730 A | 5/2000 | Ginsberg |
| 6,064,731 A | 5/2000 | Flockhart et al. |
| 6,084,954 A | 7/2000 | Harless et al. |
| 6,088,441 A | 7/2000 | Flockhart et al. |
| 6,108,670 A | 8/2000 | Weida et al. |
| 6,115,462 A | 9/2000 | Servi et al. |
| 6,128,304 A | 10/2000 | Gardell et al. |
| 6,151,571 A | 11/2000 | Pertrushin |
| 6,154,769 A | 11/2000 | Cherkasova et al. |
| 6,163,607 A | 12/2000 | Bogart et al. |
| 6,173,053 B1 | 1/2001 | Bogart et al. |
| 6,175,564 B1 | 1/2001 | Miloslavsky et al. |
| 6,178,441 B1 | 1/2001 | Elnozahy |
| 6,185,292 B1 | 2/2001 | Miloslavsky |
| 6,185,603 B1 | 2/2001 | Henderson et al. |
| 6,192,122 B1 | 2/2001 | Flockhart et al. |
| 6,215,865 B1 | 4/2001 | McCalmont |
| 6,226,377 B1 | 5/2001 | Donaghue, Jr. |
| 6,229,819 B1 | 5/2001 | Darland et al. |
| 6,230,183 B1 | 5/2001 | Yocom et al. |
| 6,233,333 B1 | 5/2001 | Dezonmo |
| 6,240,417 B1 | 5/2001 | Eastwick et al. |
| 6,259,969 B1 | 7/2001 | Tackett et al. |
| 6,263,359 B1 | 7/2001 | Fong et al. |
| 6,272,544 B1 | 8/2001 | Mullen |
| 6,275,806 B1 | 8/2001 | Pertrushin |
| 6,275,812 B1 | 8/2001 | Haq et al. |
| 6,275,991 B1 | 8/2001 | Erlin |
| 6,278,777 B1 | 8/2001 | Morley et al. |
| 6,292,550 B1 | 9/2001 | Burritt |
| 6,295,353 B1 | 9/2001 | Flockhart et al. |
| 6,298,062 B1 | 10/2001 | Gardell et al. |
| 6,307,931 B1 | 10/2001 | Vaudreuil |
| 6,324,282 B1 | 11/2001 | McIllwaine et al. |
| 6,332,081 B1 | 12/2001 | Do |
| 6,339,754 B1 | 1/2002 | Flanagan et al. |
| 6,353,810 B1 | 3/2002 | Petrushin |
| 6,356,632 B1 | 3/2002 | Foster et al. |
| 6,360,222 B1 | 3/2002 | Quinn |
| 6,366,666 B2 | 4/2002 | Bengtson et al. |
| 6,366,668 B1 | 4/2002 | Borst et al. |
| 6,389,028 B1 | 5/2002 | Bondarenko et al. |
| 6,389,132 B1 | 5/2002 | Price et al. |
| 6,389,400 B1 | 5/2002 | Bushey et al. |
| 6,411,682 B1 | 6/2002 | Fuller et al. |
| 6,424,709 B1 | 7/2002 | Doyle et al. |
| 6,426,950 B1 | 7/2002 | Mistry |
| 6,427,137 B2 | 7/2002 | Petrushin |
| 6,430,282 B1 | 8/2002 | Bannister et al. |
| 6,434,230 B1 | 8/2002 | Gabriel |
| 6,449,356 B1 | 9/2002 | Dezonno |
| 6,449,358 B1 | 9/2002 | Anisimov et al. |
| 6,449,646 B1 | 9/2002 | Sikora et al. |
| 6,453,038 B1 | 9/2002 | McFarlane et al. |
| 6,463,148 B1 | 10/2002 | Brady |
| 6,463,346 B1 | 10/2002 | Flockhart et al. |

(56) References Cited

U.S. PATENT DOCUMENTS

| | | |
|---|---|---|
| 6,463,415 B2 | 10/2002 | St. John |
| 6,463,471 B1 | 10/2002 | Dreke et al. |
| 6,480,826 B2 | 11/2002 | Pertrushin |
| 6,490,350 B2 | 12/2002 | McDuff et al. |
| 6,535,600 B1 | 3/2003 | Fisher et al. |
| 6,535,601 B1 | 3/2003 | Flockhart et al. |
| 6,553,114 B1 | 4/2003 | Fisher et al. |
| 6,560,330 B2 | 5/2003 | Gabriel |
| 6,560,649 B1 | 5/2003 | Mullen et al. |
| 6,560,707 B2 | 5/2003 | Curtis et al. |
| 6,563,920 B1 | 5/2003 | Flockhart et al. |
| 6,574,599 B1 | 6/2003 | Lim et al. |
| 6,597,685 B2 | 7/2003 | Miloslavsky et al. |
| 6,603,854 B1 | 8/2003 | Judkins et al. |
| 6,614,903 B1 | 9/2003 | Flockhart et al. |
| 6,650,748 B1 | 11/2003 | Edwards et al. |
| 6,668,167 B2 | 12/2003 | McDowell et al. |
| 6,675,168 B2 | 1/2004 | Shapiro et al. |
| 6,697,457 B2 | 2/2004 | Petrushin |
| 6,700,967 B2 | 3/2004 | Kleinoder et al. |
| 6,704,409 B1 | 3/2004 | Dilip et al. |
| 6,707,903 B2 | 3/2004 | Burok et al. |
| 6,738,462 B1 | 5/2004 | Brunson |
| 6,744,877 B1 | 6/2004 | Edwards |
| 6,754,333 B1 | 6/2004 | Flockhart et al. |
| 6,757,362 B1 | 6/2004 | Cooper et al. |
| 6,766,013 B2 | 7/2004 | Flockhart et al. |
| 6,766,014 B2 | 7/2004 | Flockhart et al. |
| 6,775,377 B2 | 8/2004 | McIllwaine et al. |
| 6,785,666 B1 | 8/2004 | Nareddy et al. |
| 6,822,945 B2 | 11/2004 | Petrovykh |
| 6,829,348 B1 | 12/2004 | Schroeder et al. |
| 6,839,735 B2 | 1/2005 | Wong et al. |
| 6,842,503 B1 | 1/2005 | Wildfeuer |
| 6,915,305 B2 | 7/2005 | Subramanian et al. |
| 6,947,543 B2 | 9/2005 | Alvarado et al. |
| 6,968,052 B2 | 11/2005 | Wullert, II |
| 6,981,061 B1 | 12/2005 | Sakakura |
| 6,988,126 B2 | 1/2006 | Wilcock et al. |
| 7,035,808 B1 | 4/2006 | Ford |
| 7,035,927 B2 | 4/2006 | Flockhart et al. |
| 7,076,051 B2 | 7/2006 | Brown et al. |
| 7,100,200 B2 | 8/2006 | Pope et al. |
| 7,110,525 B1 | 9/2006 | Heller et al. |
| 7,117,193 B1 | 10/2006 | Basko et al. |
| 7,155,612 B2 | 12/2006 | Licis |
| 7,158,628 B2 | 1/2007 | McConnell et al. |
| 7,170,976 B1 | 1/2007 | Keagy |
| 7,177,401 B2 | 2/2007 | Mundra et al. |
| 7,200,219 B1 | 4/2007 | Edwards et al. |
| 7,203,655 B2 | 4/2007 | Herbert et al. |
| 7,212,625 B1 | 5/2007 | McKenna et al. |
| 7,215,744 B2 | 5/2007 | Scherer |
| 7,222,075 B2 | 5/2007 | Petrushin |
| 7,246,371 B2 | 7/2007 | Diacakis et al. |
| 7,266,508 B1 | 9/2007 | Owen et al. |
| 7,283,805 B2 | 10/2007 | Agrawal |
| 7,295,669 B1 | 11/2007 | Denton et al. |
| 7,299,259 B2 | 11/2007 | Petrovykh |
| 7,336,779 B2 | 2/2008 | Boyer et al. |
| 7,376,127 B2 | 5/2008 | Hepworth et al. |
| 7,392,402 B2 | 6/2008 | Suzuki |
| 2001/0056349 A1 | 12/2001 | St. John |
| 2002/0002464 A1 | 1/2002 | Pertrushin |
| 2002/0010587 A1 | 1/2002 | Pertrushin |
| 2002/0019829 A1 | 2/2002 | Shapiro |
| 2002/0021307 A1 | 2/2002 | Glenn et al. |
| 2002/0035605 A1 | 3/2002 | McDowell et al. |
| 2002/0038422 A1 | 3/2002 | Suwamoto et al. |
| 2002/0065894 A1 | 5/2002 | Dalal et al. |
| 2002/0076010 A1 | 6/2002 | Sahai |
| 2002/0085701 A1 | 7/2002 | Parsons et al. |
| 2002/0087630 A1 | 7/2002 | Wu |
| 2002/0112186 A1 | 8/2002 | Ford et al. |
| 2002/0116336 A1 | 8/2002 | Diacakis et al. |
| 2002/0116461 A1 | 8/2002 | Diacakis et al. |
| 2003/0014491 A1 | 1/2003 | Horvitz et al. |
| 2003/0028621 A1 | 2/2003 | Furlong et al. |
| 2003/0073440 A1 | 4/2003 | Mukherjee et al. |
| 2003/0093465 A1 | 5/2003 | Banerjee et al. |
| 2003/0144900 A1 | 7/2003 | Whitmer |
| 2003/0144959 A1 | 7/2003 | Makita |
| 2003/0174830 A1 | 9/2003 | Boyer et al. |
| 2003/0177017 A1 | 9/2003 | Boyer et al. |
| 2003/0231757 A1 | 12/2003 | Harkreader et al. |
| 2004/0008828 A1 | 1/2004 | Coles et al. |
| 2004/0057569 A1* | 3/2004 | Busey et al. ............ 379/265.09 |
| 2004/0103324 A1 | 5/2004 | Band |
| 2004/0138944 A1 | 7/2004 | Whitacre et al. |
| 2004/0162998 A1 | 8/2004 | Tuomi et al. |
| 2004/0202309 A1 | 10/2004 | Baggenstoss et al. |
| 2004/0203878 A1 | 10/2004 | Thomson |
| 2004/0210475 A1 | 10/2004 | Starnes et al. |
| 2005/0021529 A1 | 1/2005 | Hodson et al. |
| 2005/0027612 A1 | 2/2005 | Walker et al. |
| 2005/0044375 A1 | 2/2005 | Paatero et al. |
| 2005/0071211 A1 | 3/2005 | Flockhart et al. |
| 2005/0071212 A1 | 3/2005 | Flockhart et al. |
| 2005/0071241 A1 | 3/2005 | Flockhart et al. |
| 2005/0071844 A1 | 3/2005 | Flockhart et al. |
| 2005/0125458 A1 | 6/2005 | Sutherland et al. |
| 2005/0154708 A1 | 7/2005 | Sun |
| 2006/0007916 A1 | 1/2006 | Jones et al. |
| 2006/0015388 A1 | 1/2006 | Flockhart et al. |
| 2006/0056598 A1 | 3/2006 | Brandt et al. |
| 2006/0135058 A1 | 6/2006 | Karabinis |
| 2006/0178994 A1 | 8/2006 | Stolfo et al. |
| 2006/0271418 A1 | 11/2006 | Hackbarth et al. |
| 2007/0083572 A1 | 4/2007 | Bland et al. |
| 2007/0127643 A1 | 6/2007 | Keagy |
| 2007/0230681 A1 | 10/2007 | Boyer et al. |
| 2008/0056165 A1 | 3/2008 | Petrovykh |

FOREIGN PATENT DOCUMENTS

| | | |
|---|---|---|
| EP | 0501189 | 9/1992 |
| EP | 0740450 | 10/1996 |
| EP | 0772335 | 5/1997 |
| EP | 0829996 | 3/1998 |
| EP | 0855826 | 7/1998 |
| EP | 0863651 | 9/1998 |
| EP | 0866407 | 9/1998 |
| EP | 0899673 | 3/1999 |
| EP | 0998108 | 5/2000 |
| EP | 1035718 | 9/2000 |
| EP | 1091307 | 4/2001 |
| EP | 1150236 | 10/2001 |
| GB | 2273418 | 6/1994 |
| GB | 2290192 | 12/1995 |
| WO | WO 96/07141 | 3/1996 |
| WO | WO 97/28635 | 8/1997 |
| WO | WO 98/56207 | 12/1998 |
| WO | WO 01/80094 | 10/2001 |

OTHER PUBLICATIONS

Kimball, et al., "Practical Techniques for Extracting, Cleaning, Conforming, and Delivering Data." *The Data Warehouse ETL Toolkit*. 2004. Ch. 5, pp. 170-174.

Snape, James, "Time Dimension and Time Zones." 2004. pp. 1-10. http://www.jamessnape.me.uk/blog/CommentView,gui,79e910a1-0150-4452-bda3-e98df . . . .

US 6,537,685, 03/2003, Fisher et al. (withdrawn).

"Applications, NPRI's Predictive Dialing Package," Computer Technology (Fall 1993), p. 86.

"Call Center Software You Can't Outgrow," Telemarketing® (Jul. 1993), p. 105.

"Domain Name Services," available at http://www.pism.com/chapt09/chapt09.html, downloaded Mar. 31, 2003, 21 pages.

"eGain's Commerce 2000 Platform Sets New Standard for eCommerce Customer Communications," Business Wire (Nov. 15, 1999)., 3 pages.

(56) References Cited

OTHER PUBLICATIONS

"Internet Protocol Addressing," available at http://samspade.org/d/ipdns.html, downloaded Mar. 31, 2003, 9 pages.
"Product Features," Guide to Call Center Automation, Brock Control Systems, Inc., Activity Managers Series™, Section 5—Company B120, p. 59, 1992.
"Product Features," Guide to Call Center Automation, CRC Information Systems, Inc., Tel-ATHENA, Section 5—Company C520, p. 95, 1992.
"VAST™, Voicelink Application Software for Teleservicing®," System Manager User's Guide, Digital Systems (1994), pp. ii, vii-ix, 1-2, 2-41 through 2-77.
"When Talk Isn't Cheap," Sm@rt Reseller, v. 3, n. 13 (Apr. 3, 2000), p. 50.
A.A. Vaisman et al., "A Temporal Query Language for OLAP: Implementation and a Case Study", LNCS, 2001, vol. 2397, 36 pages.
Ahmed, Sarah, "A Scalable Byzantine Fault Tolerant Secure Domain Name System," thesis submitted to Massachusetts Institute of Technology, Department of Electrical Engineering and Computer Science, Jan. 22, 2001, 101 pages.
An Expert's Guide to Oracle Technology blog, My Personal Dictionary, Lewis R. Cunningham, posted Mar. 31, 2005, http://blogs.ittoolbox.com/oracle'guide/archives003684.asp, 4 pages.
Atkins et a.l; "Common Presence and Instant Messaging: Message Format," Network Working Group (Jan. 9, 2003), available at http://www.ietf.org/internet-drafts/draft-ietf-impp-cpim-msgfmt-08.txt, 31 pages.
Avaya, Inc. Business Advocate Options, at http://www.avaya.com, downloaded on Feb. 15, 2003, Avaya, Inc. 2003.
Avaya, Inc. Business Advocate Product Summary, at http://www.avaya.com, downloaded on Feb. 15, 2003, Avaya, Inc. 2003, 3 pages.
Avaya, Inc. CentreVu Advocate, Release 9, User Guide, Dec. 2000.
Avaya, Inc., "Better Implementation of IP in Large Networks," Avaya, Inc. 2002, 14 pages.
Avaya, Inc., "The Advantages of Load Balancing in the Multi-Call Center Enterprise," Avaya, Inc., 2002, 14 pages.
Avaya, Inc., "Voice Over IP via Virtual Private Networks: An Overview," Avaya, Inc., Feb. 2001, 9 pages.
Bellsouth Corp., "Frequently Asked Questions—What is a registrar?," available at https://registration.bellsouth.net/NASApp/DNSWebUI/Faq.jsp, downloaded Mar. 31, 2003, 4 pages.
Bill Michael, "The Politics of Naming" www.cConvergence.com (Jul. 2001) pp. 31-35.
Chavez, David, et al., "Avaya MultiVantage Software: Adapting Proven Call Processing for the Transition to Converged IP Networks," Avaya, Inc., Aug. 2002.
Coles, Scott, "A Guide for Ensuring Service Quality in IP Voice Networks," Avaya, Inc., 2002, pp. 1-17.
ComputerWorld, ETL, M. Songini, at http://www.computerworld.com/databasetopics/businessintelligence/datawarehouse/story/ . . . , copyright 2005, 5 pages.
Creating and Using Data Warehouse—Using Dimensional Modeling (Microsoft) downloaded May 18, 2005 http://msdn.microsoft.com/library/en-us/createdw/createdw_39z.asp?frame=true 1 page.
Creating and Using Data Warehouse Dimension Tables (Microsoft) copyright 2005, http://msdn.microsoft.com/library/en-us/createdw/createdw_10kz.asp?frame=true, 3 pages.
Crocker et al.; "Common Presence and Instant Messaging (CPIM)," Network Working Group (Aug. 14, 2002), available at http://www.ietf.org/internet-drafts/draft-ietf-impp-cpim-03.txt, 33 pages.
CS 345: Topics in Data Warehousing, Oct. 5, 2004, 36 pages.
Data Warehouse Designer—Design Constraints and Unavoidable Realities, No design Problem in School was This Hard, Ralph Kimball, Sep. 3, 2002, 3 pages.
Data Warehouse Designer—An Engineer's View—Its' Worthwhile to Remind Ourselves Why We Build Data Warehouses the Way We Do, Ralph Kimball, Jul. 26, 2002, 3 pages.
Data Warehouse Designer—Divide and Conquer, Build Your Data Warehouse One Piece at a Time, Ralph Kimball, Oct. 30, 2002, 3 pages.
Data Warehouse Designer—TCO Starts with the End User, Ralph Kimball, May 13, 2003, http://www.intelligententerprise.com/030513/608warehouse1_1.jhtml?_requestid=598425, 3 pages.
Data Warehouse Designer—The Soul of the Data Warehouse, Part One: Drilling Down, Ralph Kimball, Mar. 20, 2003, 3 pages.
Data Warehouse Designer—The Soul of the Data Warehouse, Part Two: Drilling Across, Ralph Kimball, Apr. 5, 2003, 3 pages.
Data Warehouse Designer—The Soul of the Data Warehouse, Part Three: Handling Time, Ralph Kimball, Apr. 22, 2003, 3 pages.
Data Warehouse Designer—Two Powerful Ideas, the Foundation for Modern Data Warehousing, Ralph Kimball, Sep. 17, 2002, 3 pages.
Data Warehouse Designer Fact Tables and Dimension, Jan. 1, 2003, http://www.inteeigententerprise.com/030101/602warehouse1_1.jhtml, Ralph Kimball, 3 pages.
Dawson, "NPRI's Powerguide, Software Overview" Call Center Magazine (Jun. 1993), p. 85.
Day et al.; "A Model for Presence and Instant Messaging," Network Working Group (Feb. 2000), available at http://www.ietf.org/rfc/rfc2778.txt?number=2778, 16 pages.
Day et al.; "Instant Messaging/Presence Protocol Requirements," Network Working Group (Feb. 2000), available at http://www.ietf.org/rfc/rfc2779.txt?number=2779, 25 pages.
DEFINITY Communications System Generic 3 Call Vectoring/Expert Agent Selection (EAS) Guide, AT&T publication No. 555-230-520 (Issue 3, Nov. 1993).
DMReview—Business Dimensional Modeling: The Logical Next Step: Translating the BDM, Laura Reeves, published May 2004, 4 pages.
Doo-Hyun Kim et al. "Collaborative Multimedia Middleware Architecture and Advanced Internet Call Center," Proceedings at the International Conference on Information Networking (Jan. 31, 2001), pp. 246-50.
E. Noth et al., "Research Issues for the Next Generation Spoken": University of Erlangen-Nuremberg, Bavarian Research Centre for Knowledge-Based Systems, at http://www5.informatik.uni-erlangen.de/literature/psdir/1999/Noeth99:RIF.ps.gz, 1999, 8 pages.
Foster, Robin, et al., "Avaya Business Advocate and its Relationship to Multi-Site Load Balancing Applications," Avaya, Inc., Mar. 2002, 14 pages.
Fundamentals of Data Warehousing—Unit 3—Dimensional Modeling, Fundamentals of Data Warehousing, copyright 2005—Evolve Computer Solutions, 55 pages.
G. Hellstrom et al., "RFC 2793—RTP Payload for Text Consersation," Network Working Group Request for Comments 2793 (May 2000), available at http://www.faqs.org/rfcs/rfc2793.html, 8 pages.
G. Wiederhold, "Mediation to Deal with Heterogeneous Data Sources", Stanford University, Jan. 1999, 19 pages.
Glossary—Curlingstone Publishing, http://www.curlingstone.com/7002/7002glossary.html, downloaded May 24, 2005, 11 pages.
Gulbrandsen et al.; "A DNS RR for Specifying the Location of Services (DNS SRV)," Network Working Group (Feb. 2000), available at http://www.ietf.org/rfc/rfc2782.txt?number=2782, 12 pages.
H. Schulzrinne et al., "RFC 2833—RTP Payload for DTMF Digits, Telephony Tones and Telephony Signals," Network Working Group Request for Comments 2833 (May 2000), available at http://www.faqs.org/rfcs/rfc2833.html, 23 pages.
J.E. Bentley, "Metadata: Everyone Talks About It, But What Is It?", First Union National Bank, date unknown, 5 pages.
John H.L. Hansen and Levent M. Arsian, Foreign Accent Classification Using Source Generator Based Prosodic Features, IEEE Proc. ICASSP, vol. 1, pp. 836-839, Detroit USA (May 1995).
L. Cabibbo et al., "An Architecture for Data Warehousing Supporting Data Independence and Interoperability", International Journal of Cooperative Information Systems, Nov. 2004, 41 pages.
L.F. Lamel and J.L. Gauvain, Language Identification Using Phone-Based Acoustic Likelihood, ICASSP-94, 1994; 4 pages.
Levent M. Arsian and John H.L. Hansen, Language Accent Classification in American English, Robust Speech Processing Laboratory, Duke University Department of Electrical Engineering, Durham, NC, Technical Report RSPL-96-7, revised Jan. 29, 1996. pp. 1-16.
Levent M. Arsian, Foreign Accent Classification in American English, Department of Electrical Computer Engineering, Duke University, Thesis, pp. 1-200 (1996).

(56) References Cited

OTHER PUBLICATIONS

MIT Project Oxygen, Pervasive, Human-Centered Computing (MIT Laboratory for Computer Science) (Jun. 2000) pp. 1-15.
Multi-Dimensional Modeling with BW ASAP for BW Accelerator Business Information Warehouse, copyright 2000, 71 pages.
Presentation by Victor Zue, The MIT Oxygen Project, MIT Laboratory for Computer Science (Apr. 25-26, 2000) 9 pages.
Richard Shockey, "ENUM: Phone Numbers Meet the Net" www.cConvergence.com (Jul. 2001) pp. 21-30.
Rose et al..; "The APEX Presence Service," Network Working Group (Jan. 14, 2002), available at http://www.ietf.org/internet-drafts/draft-ietf-apex-presence-06.txt, 31 pages.
Stevenson et al.; "Name Resolution in Network and Systems Management Environments"; http://netman.cit.buffalo.edu/Doc/DStevenson/NR-NMSE.html; printed Mar. 31, 2003; 16 pages.
Sugano et al. ;"Common Presence and Instant Messaging (CPIM) Presence Information Data Format," Network Working Group (Dec. 2002), available at http://www.ietf.org/internet-drafts/draft-ietf-impp-cpim-pidf-07.txt, 26 pages.
The Importance of Data Modeling as a Foundation for Business Insight, Larissa Moss and Steve Hoberman, copyright 2004, 38 pages.
Intelligent Enterprise Magazine—Data Warehouse Designer: Fact Tables and Dimension, downloaded May 18, 2005, http://www.intelligententerprise.com/030101/602warehouse1_1.jhtml, 7 pages.
Aspect—"Analysis and Reporting," http://aspect.com/products/analysis/index.cfm, (Copyright 2005) (1page).
Aspect—"Call Center Reports," http://aspect.com/products/analysis/ccreporting.cfm, (Copyright 2005) (2 pages).
Aspect—"Performance Optimization," http://aspect.com/products/wfm/performanceopt.cfm?section=performanceopt, (Copyright 2005) (1page).
Avaya—"Avaya and Blue Pumpkin—Providing Workforce Optimization Solutions" (Copyright 2004) (3 pages).
Avaya—"Avaya and Texas Digital Systems—Providing Real-time Access to Call Statistics" (Copyright 2004) (3 pages).
Avaya—"Avaya Basic Call Management System Reporting Desktop" (Copyright 2002) (4 pages).
Avaya—"Avaya Call Management System" (Copyright 2003) (3 pages).
Avaya—"Basic Call Management System Reporting Desktop," Product Description, http://www.avaya.com/gcm/master-usa/en-us/products/offers/bcmrs_desktop.htm (Copyright 2005) (2 pages).
Avaya—"Basic Call Management System Reporting Desktop," Product Features, http://www.avaya.com/gcm/master-usa/en-us/products/offers/bcmrs_desktop.htm (Copyright 2005) (2 pages).
Avaya—"Basic Call Management System Reporting Desktop," Product Overview, http://www.avaya.com/gcm/master-usa/en-us/products/offers/bcmrs_desktop.htm (Copyright 2005) (2 pages).
Avaya—"Basic Call Management System Reporting Desktop," Product Technical, http://www.avaya.com/gcm/master-usa/en-us/products/offers/bcmrs_desktop.htm (Copyright 2005) (2 pages).
Avaya—"Call Management System," Product Description, http://www.avaya.com/gcm/masterusa/en-us/products/offers/call_management_system.htm (Copyright 2005) (2 pages).
Avaya—"Call Management System," Product Features, http://www.avaya.com/gcm/master-usa/en-us/products/offers/call_management_system.htm (Copyright 2005) (3 pages).
Avaya—"Call Management System," Product Overview, http://www.avaya.com/gcm/master-usa/en-us/products/offers/call_management_system.htm (Copyright 2005) (2 pages).
Avaya—"Call Management System," Product Technical, http://www.avaya.com/gcm/master-usa/en-us/products/offers/call_management_system.htm (Copyright 2005) (2 pages).
Avaya—"Multi Channel Product Authorization," (PA) Version 5.0, (Nov. 2003) (6 pages).
Cherry, "Anger Management," IEEE Spectrum (Apr. 2005) (1 page).
GEOTEL Communications Corporation Web site printout entitled "Intelligent CallRouter" Optimizing the Interaction Between Customers and Answering Resources., 1998, 6 pages.
NICE Systems—"Insight from Interactions," "Overwhelmed by the Amount of Data at your Contact Center?" http://www.nice.com/products/multimedia/analyzer.php, (Printed May 19, 2005) (2 pages).
NICE Systems—"Multimedia Interaction Products," "Insight from Interactions," http://www.nice.com/products/multimedia/contact_centers.php (Printed May 19, 2005) (3 pages).
Nortel—"Centrex Internet Enabled Call Centers," http://www.products.nortel.com/go/product_assoc.jsp?segId=0&parID=0&catID=-9191&rend_id . . . (Copyright 1999-2005) (1page).
"KANA—Contact Center Support", available at http://www.kana.com/solutions.php?tid=46, copyright 2006, 3 pages.
Microsoft Office Animated Help Tool, date unknown, 1 page.
"Still Leaving It to Fate?: Optimizing Workforce Management", Durr, William Jr., Nov. 2001.
"Services for Computer Supported Telecommunications Applications (CSTA) Phase III"; Standard ECMA-269, 5th Edition—Dec. 2002; ECMA International Standardizing Information and Communication Systems; URL: http://www.ecma.ch; pp. 1-666 (Parts 1-8).
"Access for 9-1-1 and Telephone Emergency Services," Americans with Disabilities Act, U.S. Department of Justice, Civil Rights Division (Jul. 15, 1998), available at http://www.usdoj.gov/crt/ada/911ta.htm, 11 pages.
Data Warehouse—Surrogate Keys, Keep Control Over Record Identifiers by Generating New Keys for the Data Warehouse, Ralph Kimball, May 1998, 4 pages.
Andy Zmolek; "SIMPLE and Presence: Enterprise Value Propositions," Avaya presentation, 16 pages, presented Jan. 24, 2002.
Berners-Lee et al.; "Uniform Resource Identifiers (URI); Generic Syntax," Network Working Group, Request for Comments 2396 (Aug. 1998), 38 pages.
Dawson et al.; "Vcard MIME Directory Profile," Network Working Group (Sep. 1998), available at http://www.ietf.org/rfc/rfc2426.txt?number=2426, 40 pages.
Fielding et al.; "Hypertext Transfer Protocol—HTTP/1.1," Network Working Group, Request for Comments 2068 (Jan. 1997), 152 pages.
G. Klyne; "A Syntax for Describing Media Feature Sets," Network Working Group (Mar. 1999), available at http://www.ietf.org/rfc/rfc2533.txt?number=2533, 35 pages.
G. Klyne; "Protocol-independent Content Negotiation Framework," Network Working Group (Sep. 1999), available at http://www.ietf.org/rfc/rfc2703.txt?number=2703, 19 pages.
Holtman et al.; "HTTP Remote Variant Selection Algorithm—RVSA/1.0," Network Working Group (Mar. 1998), available at http://www.ietf.org/rfc/rfc2296.txt?number=2296, 13 pages.
Holtman et al.; "Transparent Content Negotiation in HTTP," Network Working Group (Mar. 1998), available at http://www.ietf.org/rfc/rfc2295.txt?number=2295, 55 pages.
Sarda, "Temporal Issues in Data Warehouse Systems", 1999, Database Applications in Non-Traditional Environments (DANTE'99), S. 27, DOI: 10.1109/DANTE.1999.844938.
Karakasidis A. "Queues for Active Data Warehousing", Jun. 17, 2005, Baltimore, MA, in Proceedings on Information Quality in Informational Systems (IQIS'2005), S.28-39, ISBN: 1-59593-160-0, DOI: 10.1109/DANTE.1999.844938.
U.S. Appl. No. 10/683,039, filed Oct. 10, 2003, Flockhart et al.
U.S. Appl. No. 10/861,193, filed Jun. 3, 2004, Flockhart et al.
U.S. Appl. No. 10/946,638, filed Sep. 20, 2004, Flockhart et al.
U.S. Appl. No. 10/815,534, filed Mar. 31, 2004, Kiefhaber.
U.S. Appl. No. 10/815,566, filed Mar. 31, 2004, Kiefhaber.
U.S. Appl. No. 10/815,584, filed Mar. 31, 2004, Kiefhaber.
Data Warehouse Designer—An Engineer's View—Its' Worthwhile to Remind Ourselves Why We Build Data Warehouses the Way We Do, Ralph Kimball, Jul. 26, 2002, 3 pages.
ComputerWorld, ETL, M. Songini, at http://www.computerworld.com/databasetopics/businessintelligence/datawarehouse/story/ . . . 5 pages.
DEFINITY Communications System Generic 3 Call Vectoring—Expert Agent Selection (EAS) Guide, AT&T publication No. 555-230-520 (Issue 3, Nov. 1993).
S. Ahmed, "A Scalable Byzantine Fault Tolerant Secure Domain Name System," thesis submitted to MIT Dept of Electrical Engineering and Computer Science, Jan. 22, 2001, 101 pages.

\* cited by examiner

DATE AND TIME DIMENSIONS FOR CONTACT CENTER REPORTING IN ARBITRARY INTERNATIONAL TIME ZONES

FIELD OF THE INVENTION

The invention relates generally to data warehousing and particularly to data warehousing in contact centers.

BACKGROUND OF THE INVENTION

Contact centers, such as Automatic Call Distribution or ACD systems, are employed by many enterprises to service customer contacts. A typical contact center includes a switch and/or server to receive and route incoming packet-switched and/or circuit-switched contacts and one or more resources, such as human agents and automated resources (e.g., Interactive Voice Response (IVR) units), to service the incoming contacts. Contact centers distribute contacts, whether inbound or outbound, for servicing to any suitable resource according to predefined criteria. Normally in present-day ACDs when the ACD system's controller detects that an agent has become available to handle a contact, the controller identifies all predefined contact-handling skills of the agent (usually in some order of priority) and delivers to the agent the highest-priority oldest contact that matches the agent's highest-priority skill.

The primary objective of contact center management, including call-distribution algorithms, is to ultimately maximize contact center performance and profitability. An ongoing challenge in contact center administration is monitoring of agent behaviors to optimize the use of contact center resources and maximize agent performance and profitably. Current products for monitoring and reporting on contact center performance, such as Call Management System or CMS™ by Avaya Inc., and Operational Analyst or OA™ by Avaya Inc. are configured as data warehouses that extract data from multiple sources, transform the data into a standardized form, and load the data into the data warehouse database. Additional calculations and reporting may be performed after the batch load. As will be appreciated, accurately tracking date and time are crucial to contact center monitoring. The fundamental measurements are about how agents are spending their time and how effective the contact center is over time.

Providing fundamental performance measures in contact centers is no simple task. The time scale of contact center data is enormous. In addition to simply labeling events according to the time they happened (e.g., 2005-10-01 01:00:00), a contact center clock must also tag events with the variously sized intervals that contain them so that time can be partitioned evenly (e.g., to know that the clock time in the prior example is both the start of the second hour and the third hour of that day, since it is a day of fall daylight saving transition in some time zones). Fine scale data must be recorded with precision of at least one second (preferably one millisecond) and arrives at a rate on the order of a thousand rows per second; that is the scale is on the order of 0.001 seconds. Large scale data is typically kept for three or more years; that is, it is kept for 100,000,000, seconds. That is a factor of 100,000,000,000 between large and small scale data.

The global scope of even a single contact center reporting center requires additional flexibility in handling date and time. The same data must be equally presentable in a local time zone, where a local supervisor is managing agents, and in an enterprise or client specific time zone where enterprise management is managing the entire contact center. For example, at the enterprise (e.g., regional or global) level the same performance data is joined in a different common time zone to analyze the balancing of traffic load between local centers and to demonstrate to clients that their contractual service objectives are being met. The set of time zones required for a particular reporting system typically depends on the locations of the various centers being supported, so it varies with system configuration.

Global time zones are more varied than is commonly realized. There are sixteen time zones in the world that are on half hour boundaries with respect to Greenich and one of them (India) is an important market for contact centers. There are even two time zones that are on quarter hour boundaries (Nepal is one). Fractional hour time zones increase the naïve count of global time zones from twenty-four to forty-two. But by far the greatest complexity in global time zones is due to daylight saving time. Time zones are differentiated not only by whether they do daylight saving time but by when they do daylight saving. The transition points in fall and spring differ by day of year (e.g., Europe enters on last Sunday in March while United States currently enters on the first Sunday in April) and by time of day (e.g., 3 a.m., 2 a.m., 1 a.m., and 11:45 p.m.). Daylight saving effects raise the count of global time zones to over five hundred (Java v. 5 recognizes 561).

Not only do daylight saving rules differ, they also change. In the United States, the period of daylight saving time will be extended by 3 weeks in spring and 1 week in fall, beginning in 2007 In 2006, Indiana is also ending its peculiar local tradition of three time zones. Daylight saving rules are so complicated, if you perform a Google™ search for the rules you will likely find predictions for the current year rather than algorithms. Even worse, the knowledge of time zones in Java does not attempt to represent historical variations in the rules but only the current rules.

Existing contact center reporting systems store all data in a single, universal time zone (UTC, a.k.a. GMT) and pass off all time zone conversion responsibilities to special reporting proprietary software. The reporting code could remap ranges of 30-minute grain summary data into the time zone of the report user, but daily, weekly, and monthly grain summaries are constrained to a preferred time zone, known in OA as the Archive Time Zone (ATZ). The selection of this time zone had to be made before the data could be summarized so the choice was frozen into the data, rather than being a choice by the user. Because of the peculiarities of international time zones and daylight saving time rules, the approach of handling all time zone conversions in the reports made reporting software too complicated for third party OnLine Analytical Processing (OLAP) tools. The result was that such tools had to display results only in the universal time zone of the data, which in many cases caused graphs of the work day to be broken into two pieces around UTC midnight.

Increasingly contact center reporting systems are using data warehouse techniques to organize data. In dimensional modeling or data warehousing, numeric performance measures (the things that are typically added up) are kept in special "fact tables" separate from the descriptive attributes (such as names and identifiers) which are kept in "dimension tables." Foreign keys in the fact tables link the measures to the individual dimension rows they describe. Typically, there are multiple foreign keys in a fact table, since the measures may be about the combination of entities from different dimensions (e.g., about a particular agent from the agent dimension answering calls in a particular queue in the queue dimension).

It has been suggested that data warehouses handle data and time as a single dimension but this approach is dismissed in the prior art as leading to an enormously sized resulting dimension table. There are over 31 million seconds in a year so keeping 10 years of data at one second resolution would require over 310 million rows in that dimension table. Instead, the standard technique is to split data and time into separate dimensions of dramatically smaller size (3,650 rows in the date dimension for 10 years and 1,440 or 86,400 rows in the time dimension for resolutions of either one minute or one second, respectively). In recent years, this standard technique has grown to include a full date-time time stamp as a separate measure in the fact table in addition to the foreign keys pointing to the date and time dimensions. Other variants dispense with the time dimension altogether. In all cases, multiple time zones require multiple sets of foreign keys/time stamps in the fact tables.

Time zone handling is the Achilles heel of conventional dimensional data models. They fail in partitioning time on the days of daylight saving transition, even in a single time zone (e.g., data from the second and third hours of the day during the transition out of daylight savings time get lumped together and there is no recognition of twenty-three hour and twenty-five hour days). The cost of time zones in database space (and consequently in access speed) discourages support of enough time zones for reporting needs (a typical warehouse with only four time zones is already using most of its space just on time stamps). And because of the way time stamps are frozen into the largest database tables, it is not feasible to alter the choice of supported time zones during the lifetime of the data warehouse (without shutting down the contact center for week-long data migration). Attempts to use multiple time stamps in the date and time dimensions to describe multiple time zones (as synonymous labels for the same instant of time, as seen from different time zones) fail because there are hours of the day for which different time zones disagree on the date and the time of day. Another way to understand this failure is to see that the choice of a particular date in a date dimension is equivalent to favoring only those time zones that agree with that choice of day. Putting the multiple time zone information in the fact tables significantly increases database size and with a consequent decrease in database performance (it is slower). The sheer size of fact tables also means that you cannot change which time zones should be supported, since it would require a complete rewrite of all fact table rows and even a schema change (to include more time zones). Such massive changes in fact tables are known from data migration experience to require up to a week or more of down time.

SUMMARY OF THE INVENTION

These and other needs are addressed by the various embodiments and configurations of the present invention. The present invention is directed generally to a data warehouse clock suitable for reporting events across multiple international time zones. The clock is effected by the arrangement of data within the tables of the database. The arrangement involves the relationships between fact tables and dimension tables in the dimensional data model of a data warehouse. The data warehouse clock is useful in any data warehouse application and is particularly applicable to the application of data warehouse technology to contact center reporting. The new structure can provide a substantial reduction in the sizes of the fact tables relative to prior art date and time dimension tables.

In one embodiment of the present invention, the date dimension includes time information at least down to the hour. Any information in a typical time dimension that would depend on time zone (e.g., hour of the day) is moved into the date dimension. To handle most of the 561 world time zones recognized by Java, the date dimension preferably goes down at least to the quarter hour, since a few time zones have offsets or transition times at 45-minute boundaries. In applications where the list of supported time zones is more restricted, the date dimension may only go down to a half hour (to handle India and fifteen other half hour offset time zones) or one hour grain (which would handle 543 time zones with full hour offsets), with a proportionate savings in the number of rows in the date dimension (e.g., a date dimension table at one hour grain is 4 times shorter than at 15 minute grain and 60 times shorter than at 1 minute grain). The date key (which is part of the primary key of the date dimension table) represents an enumeration of the physically successive intervals of time at the designed grain (e.g., successive quarter hour intervals) over the lifetime of the system (e.g., 10 years). In still other embodiments, the date dimension may go down to very fine grains, such as one minute.

The splitting of date and time dimensions in the prior art is believed to be the root cause of the problems that data warehouses have with time zones. Daylight saving time means that some days (the transition days) are different than others in how clock time maps into intervals within the day. But since time is in a separate dimension from date, time must be treated the same way regardless of the particular date, so the actual behavior of transition days is never represented accurately. The separation of date from time is also the reason that multiple time zones require multiple copies of foreign keys in the fact tables.

In one configuration, the date dimension includes representations in multiple time zones. Since information in the date dimension depends on time zone (different time zones have different calendar and clock values for what is physically the same quarter hour interval of real time), the date dimension contains multiple versions of this information for the several time zones for which the system has been configured. In database terms, this can be accomplished by the inclusion of multiple columns of information in the same row, or more generally by the inclusion of multiple rows describing the same quarter hour interval. In the latter case, the additional rows are distinguished by an additional column identifying the time zone (this column is then included along with the date key to form a two component primary key for the date dimension table).

In one configuration, the time dimension is independent of time zone. The remaining data in the time dimension describes time down to the second (or even millisecond) within the quarter hour or one-hour grain described by the date dimension. In the case where the date dimension goes down to the quarter hour, the typical time dimension would have at least 900 rows, corresponding to the 900 distinct seconds in a quarter hour. For millisecond resolution, an extreme time dimension would have 900,000 rows. In either case, the information content represents the fine grained part of the date time that is independent of time zone.

In one configuration, fact tables reference a point in time by a date key and a time key independent of time zone. With all the time zone dependence now contained in the date dimension, the fact tables no longer need to keep multiple foreign keys to support multiple time zones. These large fact tables may now make a single reference to a physical point in time rather than multiple references to synonymous expressions of that time.

In one configuration, the specific time zone used is selected by the viewer. Because the date key kept in the fact table is only part of the primary key needed for the new date dimension, the other part of the primary key (the time zone key) is supplied externally. Typically, this information comes from a parameter supplied when a report is executed. It could be inferred from the locale environment of the report user's computer, an explicit prompted choice by the user, or a default value supplied by a reporting tool.

In another embodiment, a method is provided that includes the steps:

(a) receiving a first time zone and time period-selection from a user;

(b) selecting a first time zone key corresponding to the first time zone; and (c) selecting, from among a plurality of date dimension tables, a first date dimension table for the selected first time zone key, the first date dimension table comprising the selected time period.

Each of the plurality of date dimension tables corresponds to a single value of a time zone key and multiple values of a date key. The date key identifies a selected point in time relative to a selected temporal origin, and the time zone key identifies one of a plurality of possible time zones.

One or more of the embodiments can overcome the problems of the prior art.

First, daylight saving transitions can be described exactly in all time zones. Because the date key describes physically successive quarter hours, rather than particular clock times, applications are able to distinguish, for example, the second hour of the day from the third hour of the day even on days of the fall daylight saving transition when the nominal date time of those intervals is the same (e.g., 1:00 am). Likewise, there are no "missing" physical intervals when, on the spring transition days, clocks (in some transition zones) move forward.

Second, supporting multiple time zones does necessarily have a significant space/time penalty. The fact tables are now independent of time zones so there is a significant reduction in overall database size. As will be appreciated, fact tables always overwhelm dimension tables when sizing data warehouses, so the savings in the fact tables dominate the expansion of the date dimension by many orders of magnitude.

Third, adding or changing time zones can be done at any time. Because all time zone synonyms are stored in a dimension table, which is small and static compared to the fact tables, it is a minor database operation to add, modify, or remove the support for individual time zones. Such changes could even be done during the busy hour of contact center operation. In the absence of the present invention, a large contact center might need to be closed for a week or more to do the equivalent data migration required for a time zone addition.

Fourth, time zone's rules can be handled exactly and independently. Unlike the naïve assumption that time zones are characterized merely by a time offset, the present invention preferably treats all 561 time zones of the world exactly and independently by using different sets of rules for each time zone. The rule sets describe precisely the transition days, offsets (if any), and times in each time zone. Any changes in a particular time zone, due for example to local or national ordinance in times of crisis (e.g., the United States remained on daylight saving time year round during a war, and recently started daylight saving time early to save fuel during a gas shortage), can be handled by altering the governing set of rules and regenerating that portion of the date dimension, i.e., for a particular time zone during a particular period of time, without affecting any other time zones or previous periods of time. Furthermore, there are commonly no assumptions that all time zones transition to or from daylight saving time on the same date or time of day. Finally, the present invention preferably uses different versions of the date dimension across different time zones, thereby avoiding the commonly mistaken belief that different time zones merely correspond to different additive offsets into the same dimension. As noted, when daylight saving effects are considered, the effective GMT offset of any time zone is not constant but varies with time and date in a way that itself depends on the time zone.

These and other advantages will be apparent from the disclosure of the invention(s) contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

The invention will be illustrated below in conjunction with an exemplary communication system. Although well suited for use with, e.g., a system having an ACD or other similar contact processing switch, the invention is not limited to use with any particular type of communication system switch or configuration of system elements. Those skilled in the art will recognize that the disclosed techniques may be used in any communication application in which it is desirable to provide improved event (e.g., contact) processing.

Figure 1:
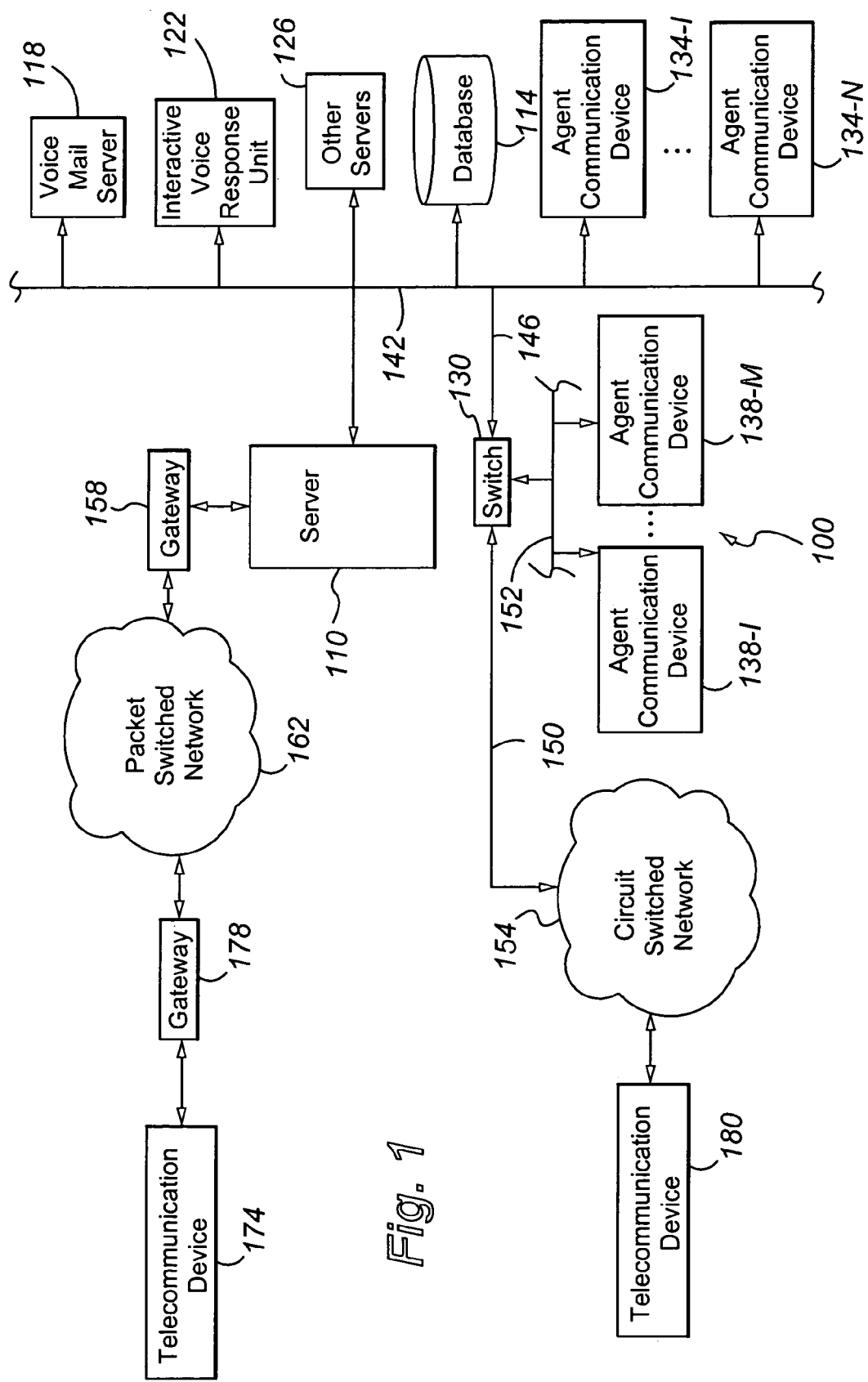
FIG. 1 is a block diagram of a contact center according to an embodiment of the present invention.

FIG. 1 shows an illustrative embodiment of the present invention. A contact center 100 comprises a central server 110, a set of data stores or databases 114 containing contact or customer related information, agent information, and other contact center information that can enhance the value and efficiency of the contact center operation, and a plurality of servers, namely a voice mail server 118, an Interactive Voice Response unit or IVR 122, and other servers 126 (such as a predictive dialer), a switch 130, a plurality of working agents operating packet-switched (first) telecommunication devices 134-1 to N (such as computer work stations or personal computers), and/or circuit-switched (second) telecommunication devices 138-1 to M, all interconnected by a local area network LAN (or wide area network WAN) 142. The servers can be connected via optional communication lines 146 to the switch 130. As will be appreciated, the other servers 126 can also include a scanner (which is normally not connected to the switch 130 or Web server), VoIP software, video call software, voice messaging software, an IP voice server, a fax server, a web server, and an email server and the like. The switch 130 is connected via a plurality of trunks 150 to the Public Switched Telecommunication Network or PSTN 154 and via link(s) 152 to the second telecommunication devices 138-1 to M. A gateway 158 is positioned between the server 110 and the packet-switched network 162 to process communications passing between the server 110 and the network 162.

The term "switch" or "server" as used herein should be understood to include a PBX, an ACD, an enterprise switch, or other type of telecommunications system switch or server, as well as other types of processor-based communication control devices such as media servers, computers, adjuncts, etc.

The switch 130 and/or server 110 can be any architecture for directing contacts to one or more telecommunication devices. Illustratively, the switch and/or server can be a modified form of the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference; Avaya Inc.'s Definity™ Private-Branch Exchange (PBX)-based ACD system; Multi-Vantage™ PBX, CRM Central 2000 Server™, Communication Manager™, S8300™ media server, and/or Avaya Interaction Center™. Typically, the switch/server is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. The switch and/or server typically include a network interface card (not shown) to provide services to the serviced telecommunication devices. Other types of known switches and servers are well known in the art and therefore not described in detail herein.

The gateway 158 can be any suitable device for converting protocols, such as Avaya Inc.'s, G700 Media Gateway™, and may be implemented as hardware such as via an adjunct processor (as shown) or as a chip in the server.

The first telecommunication devices 134-1, . . . 134-N are packet-switched and can include, for example, IP hardphones such as the Avaya Inc.'s, 4600 Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, packet-based traditional computer telephony adjuncts, and any other communication device.

The second telecommunication devices 138-1, . . . 138-M are circuit-switched and can include, for example, wired and wireless telephones, PDAs, H.320 video phones and conferencing units, voice messaging and response units, traditional computer telephony adjuncts, and any other communication device.

It should be noted that the invention does not require any particular type of information transport medium between switch or server and first and second telecommunication devices, i.e., the invention may be implemented with any desired type of transport medium as well as combinations of different types of transport channels.

The packet-switched network 162 can be any data and/or distributed processing network, such as the Internet.

The packet-switched network 162 is in communication with an external first telecommunication device 174 via a gateway 178, and the circuit-switched network 154 with an external second telecommunication device 180.

It should be emphasized that the configuration of the switch, server, user telecommunication devices, and other elements as shown in FIG. 1 is for purposes of illustration only and should not be construed as limiting the invention to any particular arrangement of elements.

Figure 2:
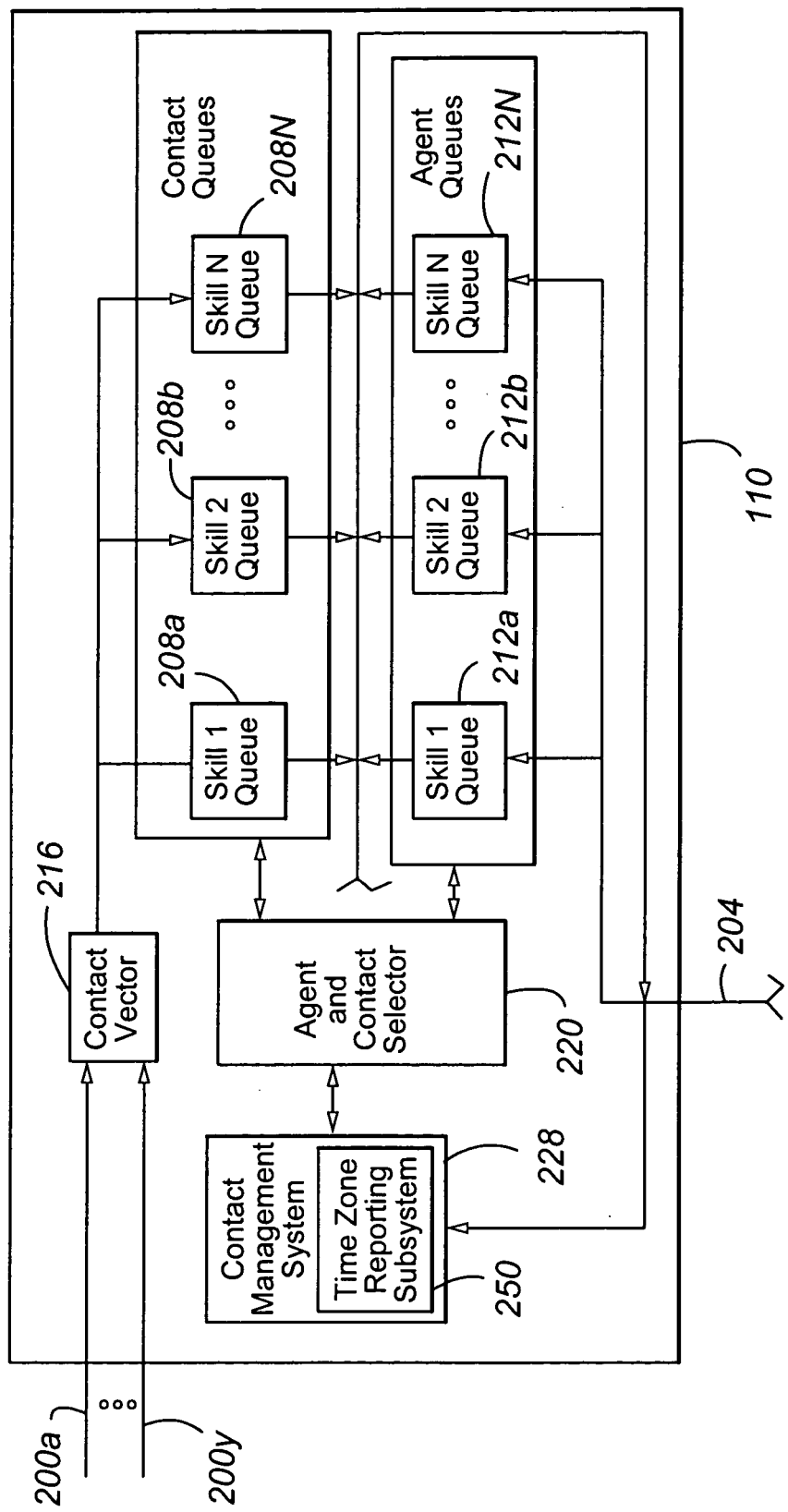
FIG. 2 is a block diagram of a server according to an embodiment of the present invention.

Referring to FIG. 2, one possible configuration of the server 110 is depicted. The server 110 is in communication with a plurality of customer communication lines 200a-y (which can be one or more trunks, phone lines, etc.) and agent communication line 204 (which can be a voice-and-data transmission line such as LAN 142 and/or a circuit switched voice line 140). The server 110 can include an event processing module 228, such as a modified form of Basic Call Management System™ or BCMS, Call Management System™, and/or Operational Analyst™ by Avaya, Inc., that gathers call records and contact-center statistics for use in generating contact-center reports.

Included among the data stored in the server 110 is a set of contact queues 208a-n and a separate set of agent queues 212a-n. Each contact queue 208a-n corresponds to a different set of agent skills, as does each agent queue 212a-n. Conventionally, contacts are prioritized and either are enqueued in individual ones of the contact queues 208a-n in their order of priority or are enqueued in different ones of a plurality of contact queues that correspond to a different priority. Likewise, each agent's skills are prioritized according to his or her level of expertise in that skill, and either agents are enqueued in individual ones of agent queues 212a-n in their order of expertise level or are enqueued in different ones of a plurality of agent queues 212a-n that correspond to a skill and each one of which corresponds to a different expertise level. Included among the control programs in the server 110 is a contact vector 216. Contacts incoming to the contact center are assigned by contact vector 216 to different contact queues 208a-n based upon a number of predetermined criteria, including customer identity, customer needs, contact center needs, current contact center queue lengths, customer value, and the agent skill that is required for the proper handling of the contact. Agents who are available for handling contacts are assigned to agent queues 212a-n based upon the skills that they possess. An agent may have multiple skills, and hence may be assigned to multiple agent queues 212a-n simultaneously. Furthermore, an agent may have different levels of skill expertise (e.g., skill levels 1-N in one configuration or merely primary skills and secondary skills in another configuration), and hence may be assigned to different agent queues 212a-n at different expertise levels. Call vectoring is described in DEFINITY Communications System Generic 3 Call Vectoring/Expert Agent Selection (EAS) Guide, AT&T publication no. 555-230-520 (Issue 3, November 1993). Skills-based ACD is described in further detail in U.S. Pat. Nos. 6,173,053 and 5,206,903.

The contact management system 228, is preferably a modified form of an Avaya™ Customer Resource Management™ product (e.g., Basic Call Management System or BCMS™, Call Management System or CMS™, and Operational Analyst™) and collects detailed information on incoming and/or outgoing contacts in the contact center. The contact management system 228 is stored either in the main memory or in a peripheral memory (e.g., disk, CD ROM, etc.) or some other computer-readable medium of the center 100.

The contact management system 228 includes a time zone reporting subsystem 250 for updating data structures, such as fact and dimension tables, to consider the effects of time zones. The reporting subsystem 250 combines date and time into a single dimension. In one configuration, the date dimension is expanded into a combined date/time zone dimension including a date key identifying time down to a selected granularity (e.g., minute) relative to a selected start date and time convention (e.g., UTC since 1970) and a time zone key having a plurality of values corresponding to a plurality of selected time zones. The combination amounts to multiple interpretations of the same date key for multiple time zones. Fact tables use only one set of keys (preferably UTC based), namely the date key (preferably UTC minutes since 1970), time key (e.g., 0 to 59 seconds), and preferably UTC-based date time key (common database date time data type). Dimensions translate to the specified time zone. This configuration permits the user to select a time zone to use for generating desired reports.

Figure 4:
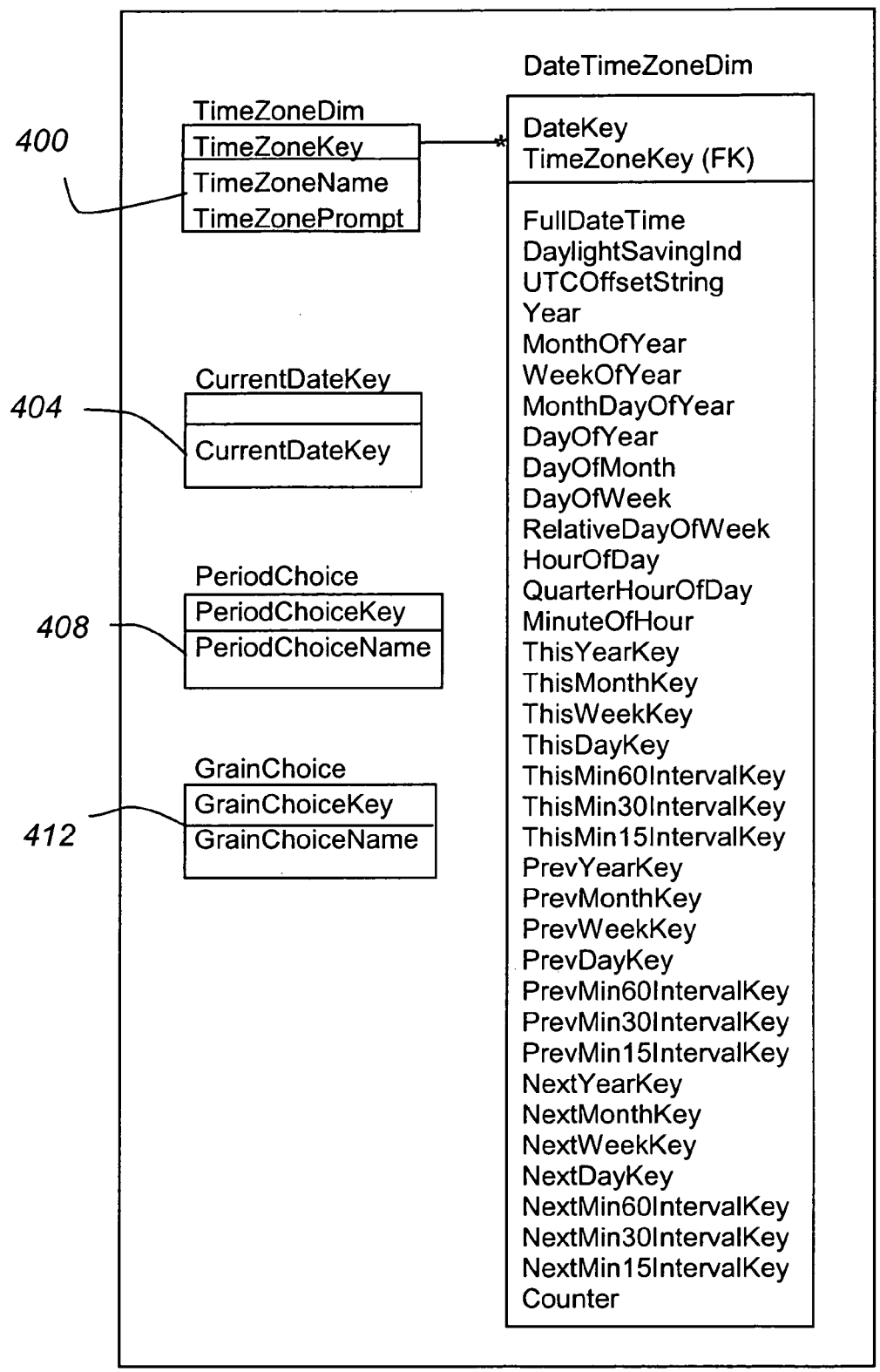
FIG. 4 is a data model comprising a set of data structures according to an embodiment of the present invention.

FIG. 4 shows a data model used by the reporting subsystem 250.

The TimeZoneDim or time zone dimension 400 comprises a TimeZoneKey or time zone primary key and attributes such as TimeZoneName or time zone name and TimeZonePrompt or time zone prompt. The time zone name is the name of the time zone, using the Java time zone ID naming convention to identify one of the several hundred time zones recognized by the Java programming language, and the time zone prompt is the name of the time zone as it appears to the report user when prompted to choose a time zone in a report specification. This table describes a time zone for which the system has been configured to support reporting. Any time zone for which the Greenwich offset, daylight saving offset, and daylight saving transition times are commensurate with the selected grain (e.g., one minute) is a candidate for this table. Time zones can be added or removed while the system is running so long as the relationship with table DateTimeZoneDim is maintained. The time zone key has a plurality of possible values corresponding to a plurality of different time zones. The table is used to create a list of time zones available for report specification.

The CurrentDateKey or current date key table 404 contains one row identifying the particular row within DateTimeZoneDim that corresponds to the current date and time.

The PeriodChoice or period choice table 408 comprises PeriodChoiceKey or period choice key and PeriodChoiceName or period choice name and lists the choices of reporting period specifications for creating report prompts. Period choice key is the parameter defining the choice of a reporting period for a report while the period choice name is the period choice string, e.g., "today" or "year to date".

The GrainChoice or grain choice table 412 lists the choice of reporting grain specifications for creating report prompts. It includes the GrainChoiceKey or grain choice key or the parameter defining the choice of a reporting grain for a report and the GrainChoiceName or grain choice name or the grain choice string, e.g., "day of week" or "monthly trend".

The DateTimeZoneDim or date/time zone dimension 416 provides multiple synonymous representations of date and time within the system, down to the selected granularity (e.g., one minute), for all time zones required for reporting. In one embodiment, there is a row in this table for each minute in the history of the system and for each time zone in which reporting is configured (i.e., 525,600 rows for each 365-day year for each configured time zone in table TimeZone). This allows all time zone effects to be captured in one dimension that handles not only the effects of different offsets relative to Greenwich but also the peculiarities of local daylight saving rules even during the days of transition, and even when daylight savings rules change historically. Each row in this dimension table will point to related rows in the same and other dimension tables to describe the larger units of time (e.g., weeks and months) to which this row belongs, and to facilitate navigation and grouping according to those larger units of time.

The date/time zone dimension 416 may include a large number of variables such as those listed below:

DateKey or date key is an integer that identifies a particular point in time, down to the minute, within the epoch. It is equal to the integer number of UTC minutes since 1970.

TimeZoneKey, a foreign key, is identified previously.

FullDateTime or full date time attribute is the full date, from year down to the resolution of the database, e.g., second or millisecond, for this point in time in the selected time zone, stored as a datetime data type. It is used in date time range comparisons and for locale-dependent representations of dates and times, including the names of months and the days of the week.

DaylightSavingInd or daylight saving indicator is a flag indicating that this point in time in the selected time zone is during the period when daylight saving is active. It can be used with the time zone key to select an alternative abbreviation for the time zone.

UTCOffsetString or UTC offset string is, for this point in time in the selected time zone, the current offset relative to UTC.

Year is the year, expressed as a number, for this point in time in the selected time zone.

MonthOfYear or month of year is the month within the year, expressed as a number, for this point in time in the selected time zone.

WeekOfYear or week of year is the week within the year, expressed as a number, for this point in time in the selected time zone.

MonthDayOfYear is the month and day within the year, expressed as a single number, for this point in time in the selected time zone.

DayOfYear or day of year is the day within the year, expressed as a number, for this point in time in the selected time zone.

DayOfMonth or day of month is the day within the month, expressed as a number, for this point in time in the selected time zone.

DayOfWeek or day of week is the day within the week, expressed as a number, for this point in time in the selected time zone.

RelativeDayOfWeek or relative day of week is the relative (ordinal) day of the week, expressed as a number, for this point in time in the selected time zone.

HourOfDay or hour of day is the clock hour within the day, expressed as a number, for this point in time in the selected time zone.

HalfHourOfDay is the clock half hour within the day, expressed as a number, for this point in time in the selected time zone.

QuarterHourOfDay is the clock quarter hour within the day, expressed as a number, for this point in time in the selected time zone.

MinuteOfHour is the clock minute within the hour, expressed as a number, for this point in time in the selected time zone.

ThisYearKey is the DateKey for the start of the year containing this point in time in the selected time zone.

ThisMonthKey is the DateKey for the start of the month containing this point in time in the selected time zone.

ThisWeekKey is the DateKey for the start of the week containing this point in time in the selected time zone.

ThisDayKey is the DateKey for today, i.e., for the start of the day containing this point in time in the selected time zone.

ThisMin60IntervalKey is the DateKey for the current hour, i.e., for the start of the 60-minute interval containing this point in time in the selected time zone.

ThisMin30IntervalKey is the DateKey for the current half hour, i.e., for the start of the 30-minute interval containing this point in time in the selected time zone.

ThisMin15IntervalKey is the DateKey for the current quarter hour, i.e., for the start of the 15-minute interval containing this point in time in the selected time zone.

PrevYearKey is the DateKey for the start of the year previous to the year containing this point in time in the selected time zone.

PrevMonthKey is the DateKey for the start of the month previous to the month containing this point in time in the selected time zone.

PrevWeekKey is the DateKey for the start of the week previous to the week containing this point in time in the selected time zone.

PrevDayKey is the DateKey for yesterday, i.e., for the start of the day previous to the day containing this point in time in the selected time zone.

Prev60IntervalKey or previous 60-minute interval key is the DateKey for the previous hour, i.e., for the start of the 60-minute interval previous to the 60-minute interval containing this point in time in the selected time zone.

Prev30IntervalKey or previous 30-minute interval key is the DateKey for the previous half hour, i.e., for the start of the 30-minute interval previous to the 30-minute interval containing this point in time in the selected time zone.

Prev15IntervalKey or previous 15-minute interval key is the DateKey for the previous quarter hour, i.e., for the start of the 15-minute interval previous to the 15-minute interval containing this point in time in the selected time zone.

NextYearKey is the DateKey for the start of the year after the year containing this point in time in the selected time zone.

NextMonthKey is the DateKey for the start of the month after the month containing this point in time in the selected time zone.

NextWeekKey is the DateKey for the start of the week after the week containing this point in time in the selected time zone.

NextDayKey is the DateKey for tomorrow, i.e., for the start of the day after the day containing this point in time in the selected time zone.

NextMin60IntervalKey is the DateKey for the next hour, i.e., for the start of the 60-minute interval after the 60-minute interval containing this point in time in the selected time zone.

NextMin30IntervalKey is the DateKey for the next half hour, i.e., for the start of the 30-minute interval after the 30-minute interval containing this point in time in the selected time zone.

NextMin15IntervalKey is the DateKey for the next quarter hour, i.e., for the start of the 15-minute interval after the 15-minute interval containing this point in time in the selected time zone.

Counter is a counter set to one. It is used in processing the fact that this row exists.

The above set of data structures can provide a computationally efficient and effective way to map user queries to selected points in time expressed as date key values and navigate, within a selected time zone, to related selected points in time. Regarding the former mapping feature, the Year, MonthOfYear, WeekOfYear, MonthDayOfYear, DayOfYear, DayOfMonth, DayOfWeek, RelativeDayOfWeek, HourOfDay, QuarterHourOfDay, and MinuteOfHour attributes are expressed in a number that is readily mapped to a user expression of time. For example, 1 p.m. Apr. 1, 2005, can be mapped to the MonthOfYear attribute having a value of 4, the DayOfWeek attribute having a value of 1, and the HourOfDay attribute having a value of 13. This mapping permits the corresponding row in the DateTimeZoneDim table to be located. Once the row is located, a number of pointers expressed as DateKey values are provided. The pointers reference other rows in the table having the corresponding DateKey value. These pointers include ThisYearKey, ThisMonthKey, ThisWeekKey, ThisDayKey, ThisMin60IntervalKey, ThisMin30IntervalKey, ThisMin15IntervalKey, PrevYearKey, PrevMonthKey, PrevWeekKey, PrevDayKey, Prev60IntervalKey, Prev30IntervalKey, Prev15IntervalKey, NextYearKey, NextMonthKey, NextWeekKey, NextDayKey, NextMin60IntervalKey, NextMin30IntervalKey, and NextMin15IntervalKey. These date key data structures permit the reporting subsystem 250 to move forwards and backwards in time in a selected time zone with low processing overhead.

The time reporting subsystem 250 may comprise various computational modules for the purpose of populating the data structures in FIG. 4. In one embodiment, computational module, known as LoadDateKey, updates the CurrentDateKey table with the current DateKey each minute. The current DateKey value is the current number of minutes since Jan. 1, 1970, 00:00:00 GMT. Another module, known as LoadDTZ, loads date time zone information into the DateTimeZoneDim table. This module generates the date time information for each minute in the specified date time range on every specified time zone and loads it into the DateTimeZoneDim table. When the contact center is configured, users can specify the time zones and their start day of the week. LoadDTZ will use those specifications to generate the correct date time information for the reporting date range to be pre-populated and load them into the DateTimeZoneDim table. The user can specify the look-ahead date range to a customized value or take the default value, which is 90 days from the current date time. At the end, it will record the minimum reporting date time (the DateKey value of the current date time), the maximum reporting date time (the DateKey value of maximum DateKey value inside of the reporting date range), and the start day of every week and the time zone name as the configuration data of the reporting date time information in a configuration table (not shown). Meanwhile, it will insert the time zone information into the TimeZoneDim table.

To facilitate depiction in conventional data model diagrams, the DateTimeZoneDim table may be logically combined in a single reporting query subject with the TimeZone table to provide a pseudo date dimension (DatePseudoDim) corresponding to the time zone that will be specified by the reporting parameters selected by the user. The data structure is realized within the reporting layer as a query subject joining the physical tables DateTimeZoneDim and TimeZoneDim using the value of TimeZoneKey specified by the report. DatePseudoDim can also provide date-only query items to the user by hiding time. DatePseudoDim is not a physical table in the database. Instead, the structure represents the logical behavior of the actual underlying physical tables.

Figure 5:
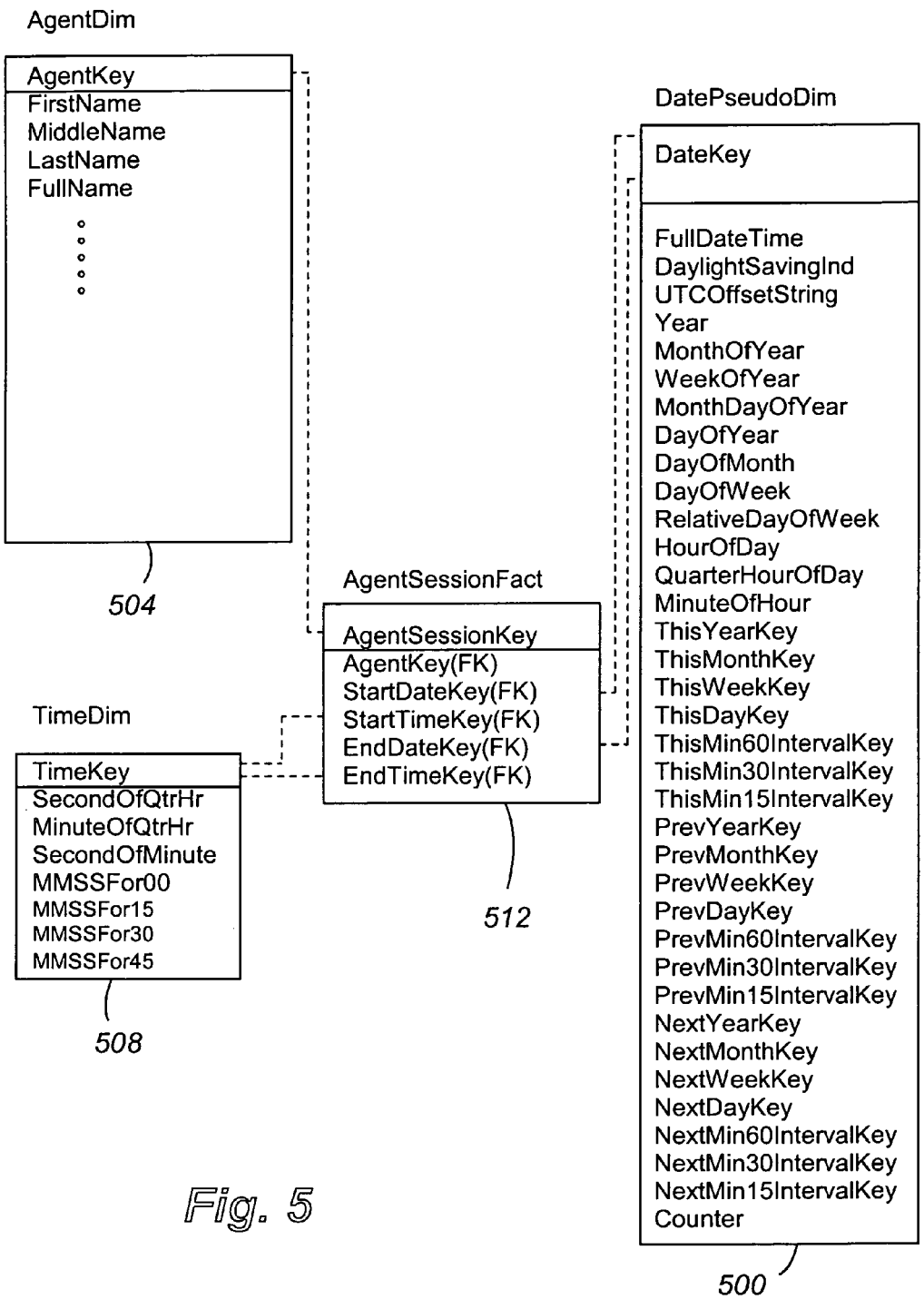
FIG. 5 is a data model comprising a set of data structures according to an embodiment of the present invention.

The conceptual basis of DatePseudoDim as a diagrammatic convenience representing DateTimeZoneDim is depicted in FIG. 5.

Referring to FIG. 5, the various dimension tables are typical of dimension tables used in a contact center reporting system. The DatePseudoDim dimension table 500, as noted, corresponds to a slice of the DateTimeZoneDim table 416 for the time zone key value selected by the user. It contains the DateKey as a primary key and the attributes discussed above with reference to the DateTimeZoneDim dimension table 416. The tables of FIG. 5 depict exemplary data structures that reference DatePseudoDim to record the start and end of agent work sessions (periods during which agents are logged in the system). Because DatePseudoDim does not contain a time zone key, it can be used to illustrate the start and end dates listed in Agent Session Fact table 512, which is independent of time zone. The agent is recognized as being assigned to receive contacts directed by the routing construct.

Other tables associated with the DatePseudoDim dimension table 500 include the AgentDim dimension table 504, TimeDim dimension table 508, and AgentSessionFact table 512.

The AgentDim dimension table 504 sets forth various attributes of the contact center agents and includes AgentKey or an agent key as a primary key. This key is a system generated unique key identifying an agent. Attributes in the table 504 include:

FirstName is the identified agent's first name.
MiddleName is the identified agent's middle name.
LastName is the identified agent's last name.
FullName or full name refers to the complete name of the identified agent.

The TimeDim table 508 sets forth various attributes of the contact center agents and includes TimeKey as a primary key. This key is a system generated unique key for the time in seconds within the quarter hour. Attributes in the table 508 include:

SecondOfQtrHr is the number of seconds since the beginning of the quarter hour.
MinuteOfQtrHr is the number of the minute within which this second lies.
SecondOfMinute is the number of seconds modulo 60 since the start of the quarter hour.
MMSSFor00 is the corresponding hour-based time in format MM-SS for a quarter hour beginning at 00:00 (i.e., in the first quarter hour).
MMSSFor15 is the corresponding hour-based time in format MM-SS for a quarter hour beginning at 15:00 (i.e., in the second quarter hour).
MMSSFor30 is the corresponding hour-based time in format MM-SS for a quarter hour beginning at 30:00 (i.e., in the third quarter hour).
MMSSFor45 is the corresponding hour-based time in format MM-SS for a quarter hour beginning at 45:00 (i.e., in the fourth quarter hour).

The table 512 sets forth various attributes of the contact center agents and includes AgentSessionKey as a primary key. This key is a system generated unique key for the assignment of an agent to a session event during a time interval. Attributes in the table 512 include:

AgentKey is a foreign key that identifies a particular agent.
StartDateKey (a foreign key) is an integer that identifies a particular quarter-hour interval within each epoch.
StartTimeKey (a foreign key) is a system generated unique key for the time in seconds within the quarter hour.
EndDateKey (a foreign key) is an integer that identifies a particular quarter-hour interval within each epoch.
EndTimeKey (a foreign key) is a system generated unique key for the time in seconds within the quarter hour.

A number of logical relationships are evident from a perusal of the tables. AgentKey, the primary key in table 504, and TimeKey, the primary key in table 508, are used as a foreign keys in table 512. StartTimeKey and EndTimeKey in table 512 are two instances of the DateKey, the primary key in table 500.

An example will be used to illustrate the differences between the prior art dimensional models of contact centers and the dimensional model of the present invention. Assume an agent session fact table describes the periods of time during which agents are logged into the system through one or more accounts An individual session begins when an agent logs into the system via any account (logid) and ends when the agent logs out of all accounts. Further assume that these facts about a session are to be described relative to three time zones, namely Time Zone A, B, and C, to permit the user to select one of the three at his or her discretion.

Figure 3:
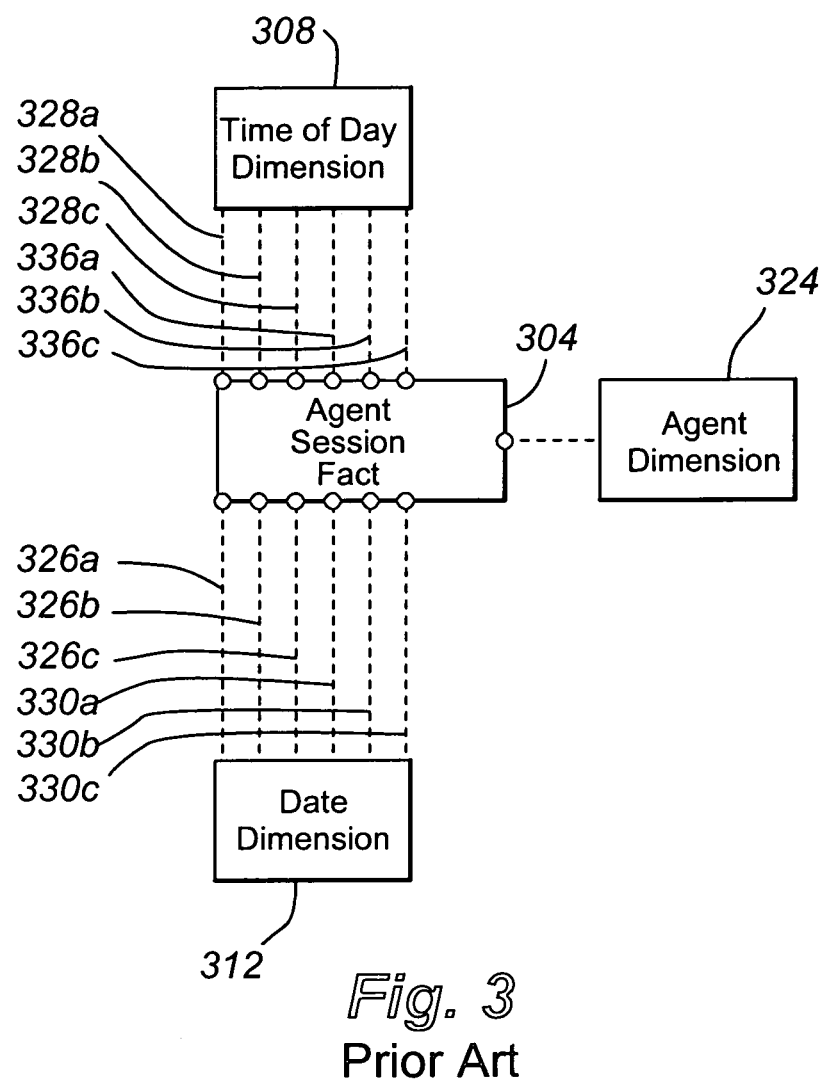
FIG. 3 is a description of a data model according to the prior art.

With reference to FIG. 3, the prior art data structures are depicted. The prior art fact table 304 contains a row for each session, indicating the agent involved (by reference to the agent dimension 324), the start and end of the session (by multiple references to the prior art date and time of day dimensions, 312 and 308 respectively). To support three time zones, e.g., A, B and C, the prior art requires twelve separate columns, namely: three each for the start date (326a, 326b and 326c), the start time (328a, 328b and 328c), the end date (330a, 330b, and 330c) and the end time (336a, 336b, 336c) plus three separate date-time columns in the fact table. As can be appreciated, each additional time zone would require four additional columns to be added to the prior art fact table, and changing any one of the time zones would require a rewrite of all rows in the prior art fact table. In this prior art configuration, date time descriptions are split into two dimensions, namely date with 1095 rows (yyyy-mm-dd for 3 years) and time with 86,400 rows (hh-mm-ss for 24 hours).

Figure 6:
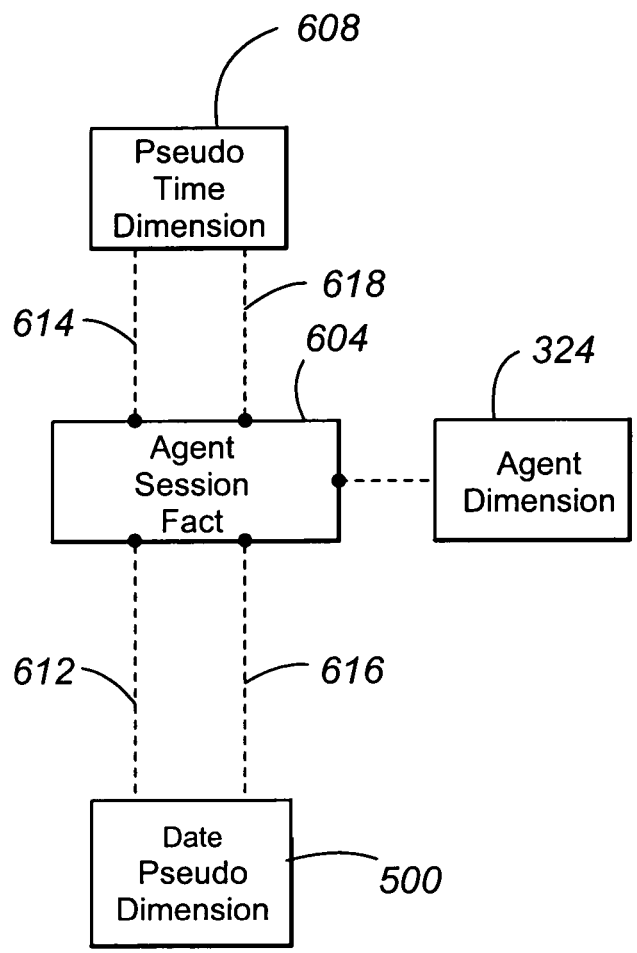
FIG. 6 is a description of a fact event according to the present invention.

FIG. 6 describes the same event(s) using the data structures of the present invention. The Date Pseudo Dimension 500 depicts the combination of the Date TimeZoneDim 416 with the TimeZoneDim 400 for a particular choice of time zone. Multiple time zones are configured within DateTimeZoneDim where they are distinguished by different values of TimeZoneKey, as described earlier. Thus each point in time identified by DateKey is synonymously described in multiple time zones. All time zone dependent date time information is therefore concentrated in Date Pseudo Dimension, while the finer grain time components that are independent of time zone are contained in the Time Dimension 608. In one embodiment, Date Pseudo Dimension goes down to the minute and Time Dimension therefore contains only the 60 seconds within each minute. In another embodiment, Date Pseudo Dimension may go down only to the quarter hour with Time Dimension describing the 900 seconds within each quarter hour. In yet another embodiment, suitable for a restricted set of time zones, the division of information between Date Pseudo Dimension and the Time Dimension may be at the hour, with the Time Dimension describing the 3600 seconds in each hour.

Because all time zone dependent components of a date time value pair are now contained in one table, the realization of fact tables in the present invention is independent of the number of time zones supported. In FIG. 6, the fact table 604 contains only one reference for each date on time datum, namely a start date reference 612, a start time reference 614, an end date reference 616 and an end time reference 618. As can be appreciated, additions or modifications of configured time zones therefore do not require expansion or rewriting of any fact tables.

A specific example is presented below, demonstrating how the various tables are populated with data and how that data is used to produce time-zone-specific reports from time-zone-neutral fact tables. The data illustrate the complicated case where an interval of interest spans the spring daylight saving transition event in one time zone, but not in other time zones, and where not all time zones are on integral hour boundaries with respect to each other. It also illustrates an embodiment in which the grain of the date dimension is chosen to be 15 minutes, e.g. to accommodate India and Katmandu.

Table 1 shows how the TimeZoneDim table 400 can be populated to configure three time zones, identified uniquely by their TimeZoneKey values (1, 2, and 3) and labeled in reports by their TimeZonePrompt values (UTC, Denver, and Pune). UTC is essentially the same as Greenwich Mean Time. Denver will illustrate daylight saving time effects (at offsets GMT-0700 and GMT-0600), and Pune will illustrate non-integral hour boundary effects (at offset GMT+530).

TABLE 1

TimeZoneDim table data

| TimeZoneKey | TimeZoneName | TimeZonePrompt |
|---|---|---|
| 1 | Europe/Greenwich | UTC |
| 2 | America/Denver | Denver |
| 3 | Asia/Calcutta | Pune |

Table 2 shows how the DateTimeZoneDim table 416 can be populated to describe 4 separate points in time (identified by their DateKey) as seen from each of the three time zones (identified by values of TimeZoneKey corresponding to the rows already configured above in TimeZoneDim). This results in 4×3=12 rows of data in the date time zone dimension. In this embodiment, illustrating a grain of 15 minutes, two additional columns are included, TimePrefix and TimeSuffix, to facilitate construction of a typical time of day format in the reports as described below.

TABLE 2

DateTimeZoneDim table data (for 15 minute date grain)

| DateKey | TimeZoneKey | FullDateTime | HourOfDay | MinuteOfHour | TimePrefix | TimeSuffix |
|---|---|---|---|---|---|---|
| 18541965 | 1 | Apr 3, 2005 8:45:00 AM | 8 | 45 | 8: | AM |
| 18541965 | 2 | Apr 3, 2005 1:45:00 AM | 1 | 45 | 1: | AM |
| 18541965 | 3 | Apr 3, 2005 2:15:00 PM | 14 | 15 | 2: | PM |
| 18541980 | 1 | Apr 3, 2005 9:00:00 AM | 9 | 0 | 9: | AM |
| 18541980 | 2 | Apr 3, 2005 3:00:00 AM | 3 | 0 | 3: | AM |
| 18541980 | 3 | Apr 3, 2005 2:30:00 PM | 14 | 30 | 2: | PM |
| 18543780 | 1 | Apr 4, 2005 3:00:00 PM | 15 | 0 | 3: | PM |
| 18543780 | 2 | Apr 4, 2005 9:00:00 AM | 9 | 0 | 9: | AM |
| 18543780 | 3 | Apr 4, 2005 8:30:00 PM | 20 | 30 | 8: | PM |
| 18544305 | 1 | Apr 4, 2005 11:45:00 PM | 23 | 45 | 11: | PM |
| 18544305 | 2 | Apr 4, 2005 5:45:00 PM | 17 | 45 | 5: | PM |
| 18544305 | 3 | Apr 5, 2005 5:15:00 AM | 5 | 15 | 5: | AM |

Table 3 shows how the TimeDim table 508 can be populated in the case where the date grain is 15 minutes. There would be 900 rows in this case, corresponding to the 900 seconds in any quarter hour interval and identified uniquely by their values of TimeKey from 0 through 899. For brevity, only 4 such rows are included in Table 3. Each row of TimeDim in this embodiment describes a particular second within an arbitrary quarter hour interval. Because there are four possible quarter hour intervals in the hour, each row effectively describes four different values for the minutes place in a typically formatted time stamp (HH:MM:SS). Thus this embodiment provides four descriptions of the MM:SS portion of the time stamp, with the HH: prefix and the AM/PM suffix to be supplied by the TimePrefix and TimeSuffix columns from the DateTimeZoneDim tables illustrated in Table 2 above.

TABLE 3

TimeDim table data (for 15 minute date grain)

| TimeKey | SecOfQtrHr | MinOfQtrHr | SecOfMin | MMSSFor00 | MMSSFor15 | MMSSFor30 | MMSSFor45 |
|---|---|---|---|---|---|---|---|
| 0 | 0 | 0 | 0 | 00:00 | 15:00 | 30:00 | 45:00 |
| 1 | 1 | 0 | 1 | 00:01 | 15:01 | 30:01 | 45:01 |
| 173 | 173 | 2 | 53 | 02:53 | 17:53 | 32:53 | 47:53 |
| 899 | 899 | 14 | 59 | 14:59 | 29:59 | 44:59 | 59:59 |

Table 4 shows how the AgentSessionFact table 512 would be populated to record two distinct sessions (identified by their values of AgentSessionKey) performed by the same agent (identified uniquely by AgentKey). Session number 1 starts on/during the last second (number 899) of a particular quarter hour interval (number 18541965) and ends at/during the $2^{nd}$ second (number 1, counting from 0) of the following quarter hour interval (number 18541980=18541965+15). Thus session number 1 is just 2 seconds long and spans a quarter hour boundary. In the Denver time zone, that particular boundary is also the point in time at which daylight saving time "springs forward" from 2:00 AM to 3:00 AM, while in the Pune time zone, that boundary is at the odd half hour time of 2:30 PM. Session number 2 is nearly 9 hours long and represents a typical same-day work period in Denver. But in Pune the same session will appear to start and end on different days. All of those complexities are handled by the date and time dimensions, resulting in a simple and efficient rendering of time in this fact table.

TABLE 4

AgentSessionFact table data

| AgentSessionKey | AgentKey | StartDateKey | StartTimeKey | EndDateKey | EndTimeKey |
|---|---|---|---|---|---|
| 1 | 17 | 18541965 | 899 | 18541980 | 1 |
| 2 | 17 | 18543780 | 173 | 18544305 | 899 |

Tables 5, 6, and 7 below show how the sessions in the AgentSessionFact table described above are rendered by a single report definition in which the user specifies one of the three time zones. Each row of the reports represents a session described by a particular row of table AgentSessionFact. The mapping of the report columns back into the database table columns of AgentSessionFact and the date time dimensions is as follows. The value of Session shown in the reports is the value of the AgentSessionKey in table AgentSessionFact. The value of Start Date in the reports is the date portion of the FullDateTime column from table DateTimeZoneDim corresponding to the row whose DateKey equals the value of the StartDateKey in table AgentSessionFact, and whose TimeZoneKey corresponds to the value of TimeZonePrompt in table TimeZoneDim as chosen by the report user. The value of Start Time in the report is composed from one of the four columns, MMSSFor00, MMSSFor15, MMSSFor30, or MMSSFor45, from the row in table TimeDim whose TimeKey equals the value of StartTimeKey in table AgentSessionFact. The choice between the four MMSSForXX columns is dictated by the value of the MinuteOfHour column in table DateTimeZoneDim for the row whose DateKey equals the value of StartDateKey in table AgentSessionFact, and whose TimeZoneKey corresponds to the value of TimeZonePrompt in table TimeZoneDim as chosen by the report user. The value of the indicated MMSSForXX column is then prefixed by the value of TimePrefix and suffixed by the value of TimeSuffix from that same row of table DateTimeZoneDim, i.e. the one whose DateKey equals the value of StartDateKey in table AgentSessionFact, and whose TimeZoneKey corresponds to the value of TimeZonePrompt in table TimeZoneDim as chosen by the report user. The values of End Date and End Time in the reports are determined analogously (substitute the word "End" for the word "Start" in the previous mappings). Although these mappings for the 15 minute embodiment may sound complex in words, they are well within the capabilities of the Structured Query Language (SQL) commonly recognized by commercially available databases.

When the report user selects the UTC time zone, the values in Table 5 appear. It shows session number 1 lasting one second before and after 9:00 AM, and session number 2 starting and ending on the same day, April 4, but just barely before midnight.

TABLE 5

Sessions as reported in UTC (TimeZoneKey = 1)

| Session | Start Date | Start Time | End Date | End Time |
|---|---|---|---|---|
| 1 | Sunday, Apr. 3, 2005 | 8:59:59 AM | Sunday, Apr. 3, 2005 | 9:00:01 AM |
| 2 | Monday, Apr. 4, 2005 | 3:02:53 PM | Monday, Apr. 4, 2005 | 11:59:59 PM |

When the report user selects the Denver time zone, the values in Table 6 appear. Since session number 1 straddles the spring daylight saving transition in Denver, the session starts just before 2:00 AM (standard time) and ends just after 3:00 AM (daylight saving time) but is nevertheless only 2 seconds long. Session number 2 from Denver's perspective looks like a typical working day that starts and ends on the same day, April 4.

TABLE 6

Sessions as reported in Denver (TimeZoneKey = 2)

| Session | Start Date | Start Time | End Date | End Time |
|---|---|---|---|---|
| 1 | Sunday, Apr. 3, 2005 | 1:59:59 AM | Sunday, Apr. 3, 2005 | 3:00:01 AM |
| 2 | Monday, Apr. 4, 2005 | 9:02:53 AM | Monday, Apr. 4, 2005 | 5:59:59 PM |

When the report user selects the Pune, India, time zone, the values in Table 7 appear. Now session number 1 straddles the half hour mark at 2:30 PM, and session number 2 begins and ends on different days (April 4 and April 5).

TABLE 7

Sessions as reported in Pune (TimeZoneKey = 3)

| Session | Start Date | Start Time | End Date | End Time |
|---|---|---|---|---|
| 1 | Sunday, Apr. 3, 2005 | 2:29:59 PM | Sunday, Apr. 3, 2005 | 2:30:01 PM |
| 2 | Monday, Apr. 4, 2005 | 8:32:53 PM | Tuesday, Apr. 5, 2005 | 5:29:59 AM |

In reviewing this example, it is important to understand that the granularity of the DateTimeZoneDim table can be varied as needed to accommodate selected time zones. In other words, each row of the table can correspond to a minute, a quarter-hour, a half-hour, an hour, and so on. As noted, some time zones start at 15-minute or 30-minute boundaries with respect to Greenwich. Most time zones start at hour boundaries with respect to Greenwich. The example above can accommodate even time zones having quarter-hour or half-hour boundaries relative to Greenwich.

As will be further appreciated, the granularity in the primary table, the DateTimeZoneDim table, affects the granularity in the auxiliary tableTimeDim. Thus, if the granularity in the primary table were one hour, all seconds within that hour appear in the auxiliary table. In the example above, the granularity in the primary table is quarter-hour; therefore, the granularity in the auxiliary table is seconds within each quarter hour. If a user wanted to represent minute 17, the first 15-minute interval would be identified by the primary table while the two-minute point within that interval would be identified by the auxiliary table. In the example, the auxiliary table has, for each time key, already added the four possibilities for each 15-minute boundary; that is, for the key 1, the potential corresponding time values are 00:01, 15:01, 30:01, and 45:01.

It can also be appreciated that other choices of grain besides 15 minutes can result in embodiments that are less complex than shown in the above example. In particular, a choice of a 1 minute grain or 1 hour grain puts knowledge of the minutes component either entirely in the primary table or entirely in the secondary table, respectively, rather than distributed over both tables as in the example. While there are various other engineering tradeoffs that may influence the choice of grain, e.g. table size and algorithmic complexity, the central contribution of this invention is that the grain be such that all time zone dependence is concentrated in the primary table, with no time zone dependence in the secondary table, for the set of time zones for which the system is being engineered. A number of variations and modifications of the invention can be used. It would be possible to provide for some features of the invention without providing others.

For example, the server and/or switch can be a software-controlled system including a processing unit (CPU), microprocessor, or other type of digital data processor executing software or an Application-Specific Integrated Circuit (ASIC) as well as various portions or combinations of such elements. The memory may be a random access memory (RAM), a read-only memory (ROM), or combinations of these and other types of electronic memory devices.

In another alternative embodiment, longer interval date time values (grains) are used for the date key and full date time attribute. For example, longer intervals could be 15, 30, or 60 minutes instead of one-minute intervals.

In another alternative embodiment, shorter interval date time values are used for the date key and full date time attribute. For example, shorter intervals could be one second.

In another embodiment, as a variation on all of the above embodiments, the time dimension could be extended down to finer grains such as 0.01 second, or 0.001 seconds.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention. Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A contact center, comprising:
a server operable to receive customer contacts and distribute the contacts to a plurality of agents for servicing; and
a database, the database comprising computer readable language expressing:
a date time zone dimension table comprising a date key and a time zone key, the date key identifying a selected point in time relative to a selected temporal origin and the time zone key identifying one of a plurality of possible time zones, and at least one attribute, the at least one attribute describing time information for a selected date and time zone key pair.

2. The contact center of claim 1, wherein the date key defines an elapsed time from the selected temporal origin at a grain of at least one of one-second, one-minute, fifteen minute, thirty minute, and sixty minute intervals.

3. The contact center of claim 2, wherein the at least one attribute identifies, for a corresponding date key value, a full date from year down to at least the grain of the date key.

4. The contact center of claim 3, wherein the at least one attribute comprises a plurality of a daylight saving indicator, an offset string relative to a selected universal time system, a year corresponding to the selected date and time zone key pair, a month of the year corresponding to the selected date and time zone key pair, a week of the year corresponding to the selected date and time zone key pair, a day of the year corresponding to the selected date and time zone key pair, a day of the month corresponding to the selected date and time zone key pair, a day of the week corresponding to the selected date and time zone key pair, a relative ordinal day of the week corresponding to the selected date and time zone key pair, an hour of the day corresponding to the selected date and time zone key pair, and a minute of the hour corresponding to the selected date and time zone key pair, a fiscal year corresponding to the selected date and time zone key pair, a fiscal half year corresponding to the selected date and time zone key pair, a fiscal quarter corresponding to the selected date and time zone key pair, and an application-specific time interval corresponding to the selected date and time zone key pair.

5. The contact center of claim 2, wherein the date time zone dimension data structure comprises a plurality of date dimension tables and wherein the selected temporal origin is 1970-01-01 00:00:00 UTC.

6. The contact center of claim 1, further comprising:
a time zone dimension table comprising the time zone key as a primary key and at least one attribute describing a time zone corresponding to a selected time key value.

7. The contact center of claim 1, wherein the language further expresses a plurality of date dimension tables generated from the date time zone dimension table, each of the date dimension tables corresponding to a single value of the time zone key and multiple values of the date key.

8. The contact center of claim 1, wherein, for the selected point in time, the date key has a plurality of values, each value corresponding to a different time zone key value.

9. The contact center of claim 1, wherein the date key is expressed in units of time of a timing convention independent of a specific time zone.

10. The contact center of claim 1, wherein the selected date key and time zone key values defines a row in the structure and wherein the row comprises a set of date key values associated with other points in time.

11. The contact center of claim 1, wherein the logical functions of the date key and time zone key are combined into one physical key.

12. The contact center of claim 1, wherein the set of date key values are associated with a plurality of this week, this day, this 60-minute interval, this 30-minute interval, this 15-minute interval, the prior year, the prior month, the prior week, the prior day, the prior 60-minute interval, the prior 30-minute interval, the prior 15-minute interval, the next year, the next week, the next month, the next day, the next 60-minute interval, the next 30-minute interval, and the next 15-minute interval, this fiscal year, this fiscal half year, this fiscal quarter, this application-specific time interval, the previous fiscal year, the previous fiscal half year, the previous fiscal quarter, the previous application-specific time interval, the next fiscal year, the next fiscal half year, the next fiscal quarter, and the next application-specific time interval.

13. A method, comprising:
(a) receiving, by a computer, a first time zone and time period;
(b) selecting, by the computer, a first time zone key corresponding to the first time zone; and
(c) selecting, by the computer, from among a plurality of date dimension tables, a first date dimension table for the selected first time zone key, the first date dimension table comprising the received time period, wherein each of the plurality of date dimension tables corresponds to a single value of a time zone key and multiple values of a date key and wherein the date key identifies a selected point in time relative to a selected temporal origin and the time zone key identifies one of a plurality of possible time zones.

14. The method of claim 13, wherein the date key defines an elapsed time from the selected temporal origin in at least one of one-second, one-minute, fifteen minute, thirty minute, and sixty minute intervals and wherein the date key is expressed in units of time of a timing convention independent of a specific time zone.

15. The method of claim 13, wherein at least one attribute corresponds to the time zone and date keys and wherein the at least one attribute comprises a plurality of a daylight saving indicator, an offset string relative to a selected universal time system, a year corresponding to the selected date and time zone key pair, a month of the year corresponding to the selected date and time zone key pair, a week of the year corresponding to the selected date and time zone key pair, a day of the year corresponding to the selected date and time zone key pair, a day of the month corresponding to the selected date and time zone key pair, a day of the week corresponding to the selected date and time zone key pair, a relative ordinal day of the week corresponding to the selected date and time zone key pair, an hour of the day corresponding to the selected date and time zone key pair, a minute of the hour corresponding to the selected date and time zone key pair, a fiscal year corresponding to the selected date and time zone key pair, a fiscal half year corresponding to the selected date and time zone key pair, a fiscal quarter corresponding to the selected date and time zone key pair, and an application-specific time interval corresponding to the selected date and time zone key pair.

* * * * *